US012610320B2

(12) United States Patent
Doshi et al.

(10) Patent No.: US 12,610,320 B2
(45) Date of Patent: Apr. 21, 2026

(54) RADIO MAP-BASED UPLINK POWER CONTROL

(71) Applicant: QUALCOMM Incorporated, San Diego, CA (US)

(72) Inventors: Akash Sandeep Doshi, San Diego, CA (US); June Namgoong, San Diego, CA (US); Taesang Yoo, San Diego, CA (US); Hyojin Lee, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 581 days.

(21) Appl. No.: 18/174,258

(22) Filed: Feb. 24, 2023

(65) Prior Publication Data

US 2024/0292338 A1     Aug. 29, 2024

(51) Int. Cl.
*H04W 52/14* (2009.01)
*H04W 52/24* (2009.01)

(52) U.S. Cl.
CPC ....... *H04W 52/146* (2013.01); *H04W 52/242* (2013.01); *H04W 52/245* (2013.01)

(58) Field of Classification Search
CPC ............. H04W 52/146; H04W 52/242; H04W 52/245; H04W 52/243; H04W 64/00
See application file for complete search history.

(56) References Cited

U.S. PATENT DOCUMENTS

| | | | |
|---|---|---|---|
| 10,321,410 B2 * | 6/2019 | Park | H04W 72/23 |
| 2020/0033849 A1 * | 1/2020 | Yiu | H04W 76/27 |
| 2020/0120482 A1 * | 4/2020 | Parkvall | H04L 65/1023 |

* cited by examiner

*Primary Examiner* — John J Lee

(74) *Attorney, Agent, or Firm* — Holland & Hart LLP /Qualcomm

(57) ABSTRACT

Methods, systems, and devices for wireless communications are described. A user equipment (UE) may receive, from a network entity, an activation signal that transitions the UE from a first mode where the UE is capable of determining a channel quality using reference signals from the network entity to a second mode where the UE is capable of determining the channel quality using radio maps associated with the network entity. The UE may receive, based at least in part on the activation signal, an indication of a set of radio maps associated with the network entity. The UE may perform a channel performance procedure to determine the channel quality associated with the network entity using the set of radio maps and a geographic location of the UE, the geographic location of the UE being mapped within the set of radio maps associated with the network entity.

26 Claims, 17 Drawing Sheets

510

520

515

505

500

130

105

115

Network
Entity

Transceiver

1210

Antenna

1215

Communications
Manager

1220

Memory

Code

1230

1225

1240

Processor

1235

1205

1200

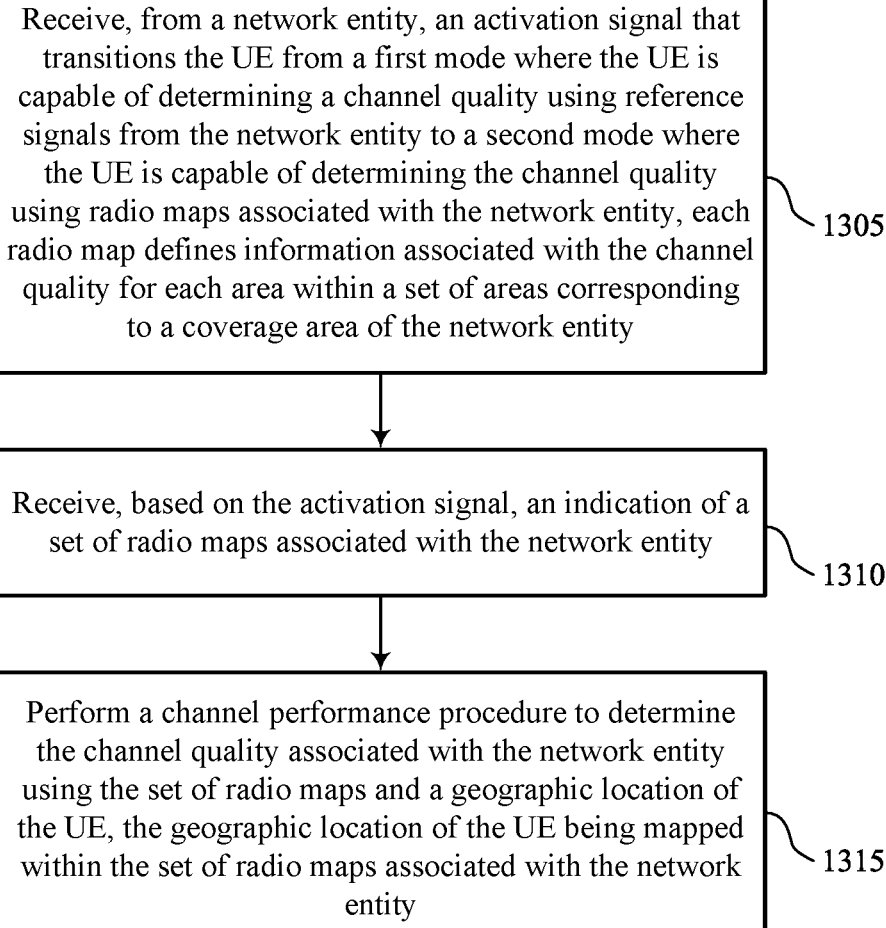

Receive, from a network entity, an activation signal that transitions the UE from a first mode where the UE is capable of determining a channel quality using reference signals from the network entity to a second mode where the UE is capable of determining the channel quality using radio maps associated with the network entity, each radio map defines information associated with the channel quality for each area within a set of areas corresponding to a coverage area of the network entity

1305

Receive, based on the activation signal, an indication of a set of radio maps associated with the network entity

1310

Perform a channel performance procedure to determine the channel quality associated with the network entity using the set of radio maps and a geographic location of the UE, the geographic location of the UE being mapped within the set of radio maps associated with the network entity

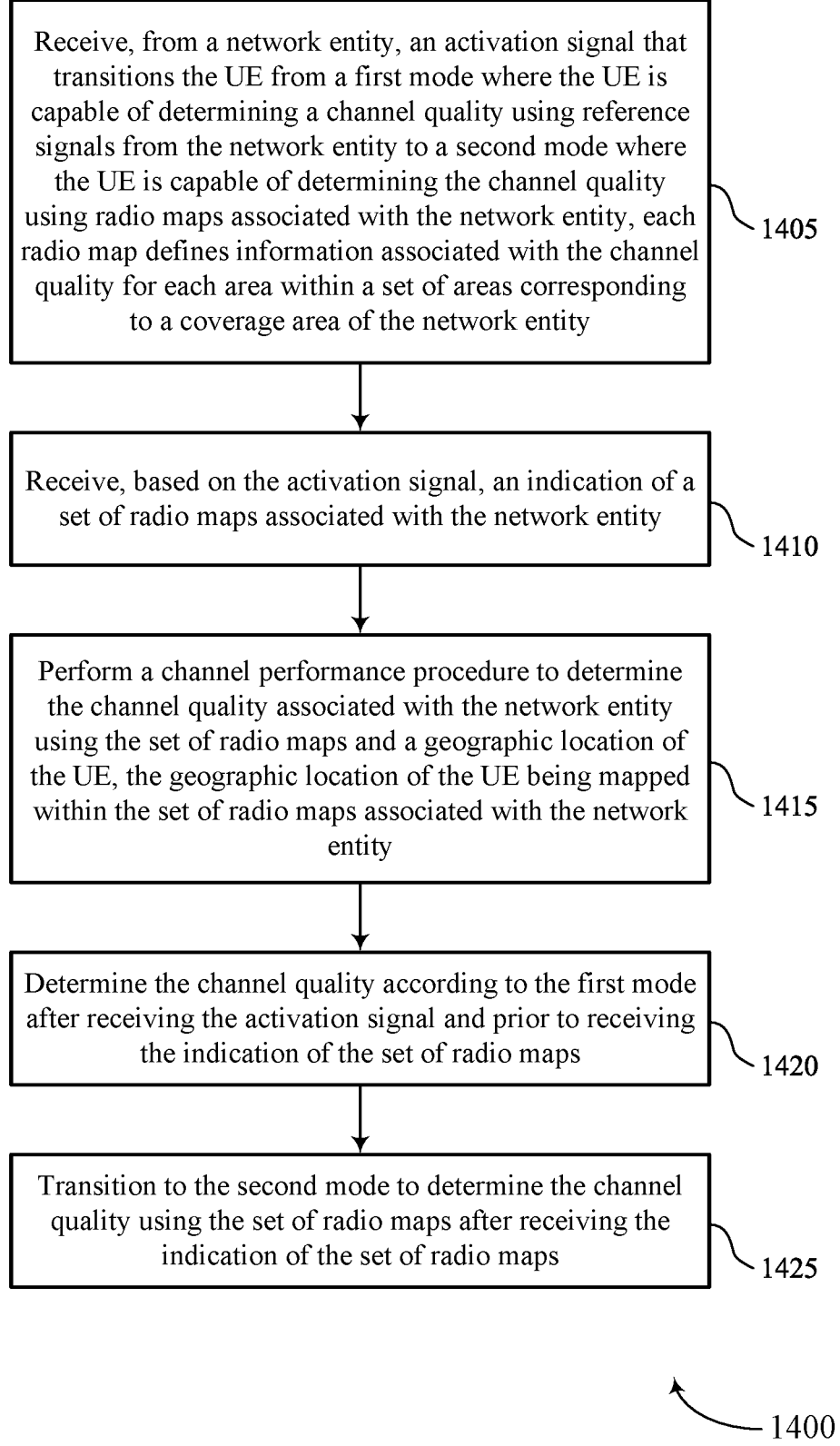

Receive, from a network entity, an activation signal that transitions the UE from a first mode where the UE is capable of determining a channel quality using reference signals from the network entity to a second mode where the UE is capable of determining the channel quality using radio maps associated with the network entity, each radio map defines information associated with the channel quality for each area within a set of areas corresponding to a coverage area of the network entity ⟍ 1405

Receive, based on the activation signal, an indication of a set of radio maps associated with the network entity ⟍ 1410

Perform a channel performance procedure to determine the channel quality associated with the network entity using the set of radio maps and a geographic location of the UE, the geographic location of the UE being mapped within the set of radio maps associated with the network entity ⟍ 1415

Determine the channel quality according to the first mode after receiving the activation signal and prior to receiving the indication of the set of radio maps ⟍ 1420

Transition to the second mode to determine the channel quality using the set of radio maps after receiving the indication of the set of radio maps ⟍ 1425

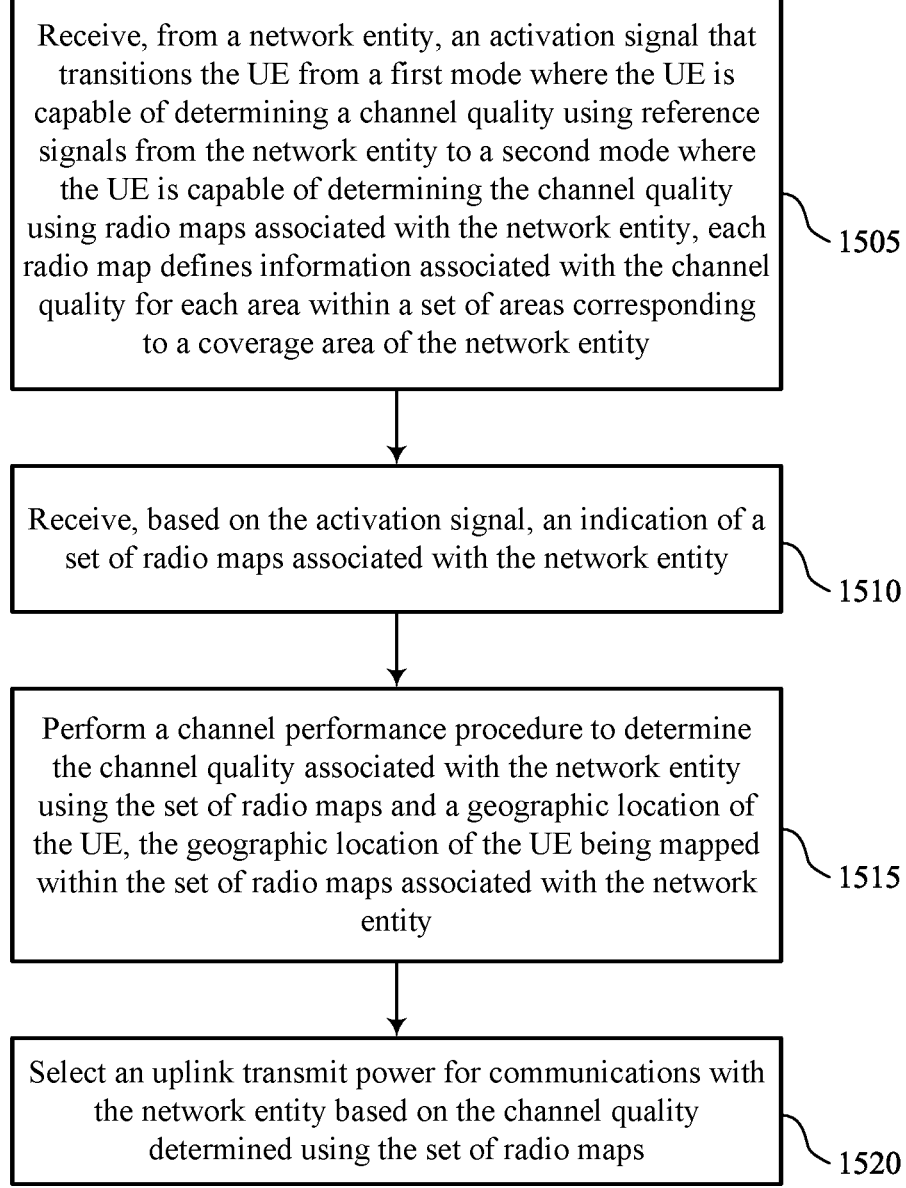

Receive, from a network entity, an activation signal that transitions the UE from a first mode where the UE is capable of determining a channel quality using reference signals from the network entity to a second mode where the UE is capable of determining the channel quality using radio maps associated with the network entity, each radio map defines information associated with the channel quality for each area within a set of areas corresponding to a coverage area of the network entity
1505

Receive, based on the activation signal, an indication of a set of radio maps associated with the network entity
1510

Perform a channel performance procedure to determine the channel quality associated with the network entity using the set of radio maps and a geographic location of the UE, the geographic location of the UE being mapped within the set of radio maps associated with the network entity
1515

Select an uplink transmit power for communications with the network entity based on the channel quality determined using the set of radio maps
1520

Figure 16:
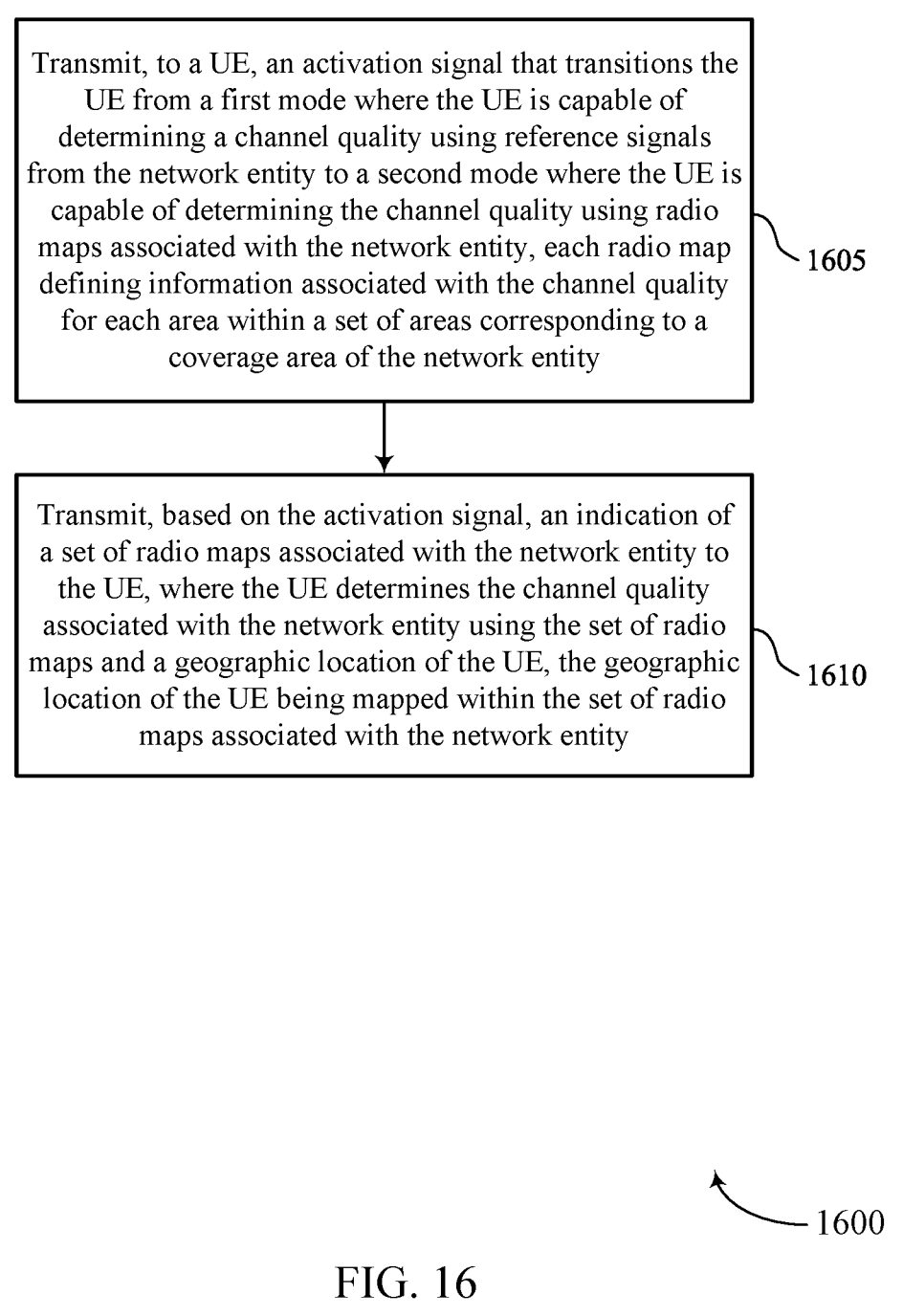

Transmit, to a UE, an activation signal that transitions the UE from a first mode where the UE is capable of determining a channel quality using reference signals from the network entity to a second mode where the UE is capable of determining the channel quality using radio maps associated with the network entity, each radio map defining information associated with the channel quality for each area within a set of areas corresponding to a coverage area of the network entity

1605

Transmit, based on the activation signal, an indication of a set of radio maps associated with the network entity to the UE, where the UE determines the channel quality associated with the network entity using the set of radio maps and a geographic location of the UE, the geographic location of the UE being mapped within the set of radio maps associated with the network entity

Figure 17:
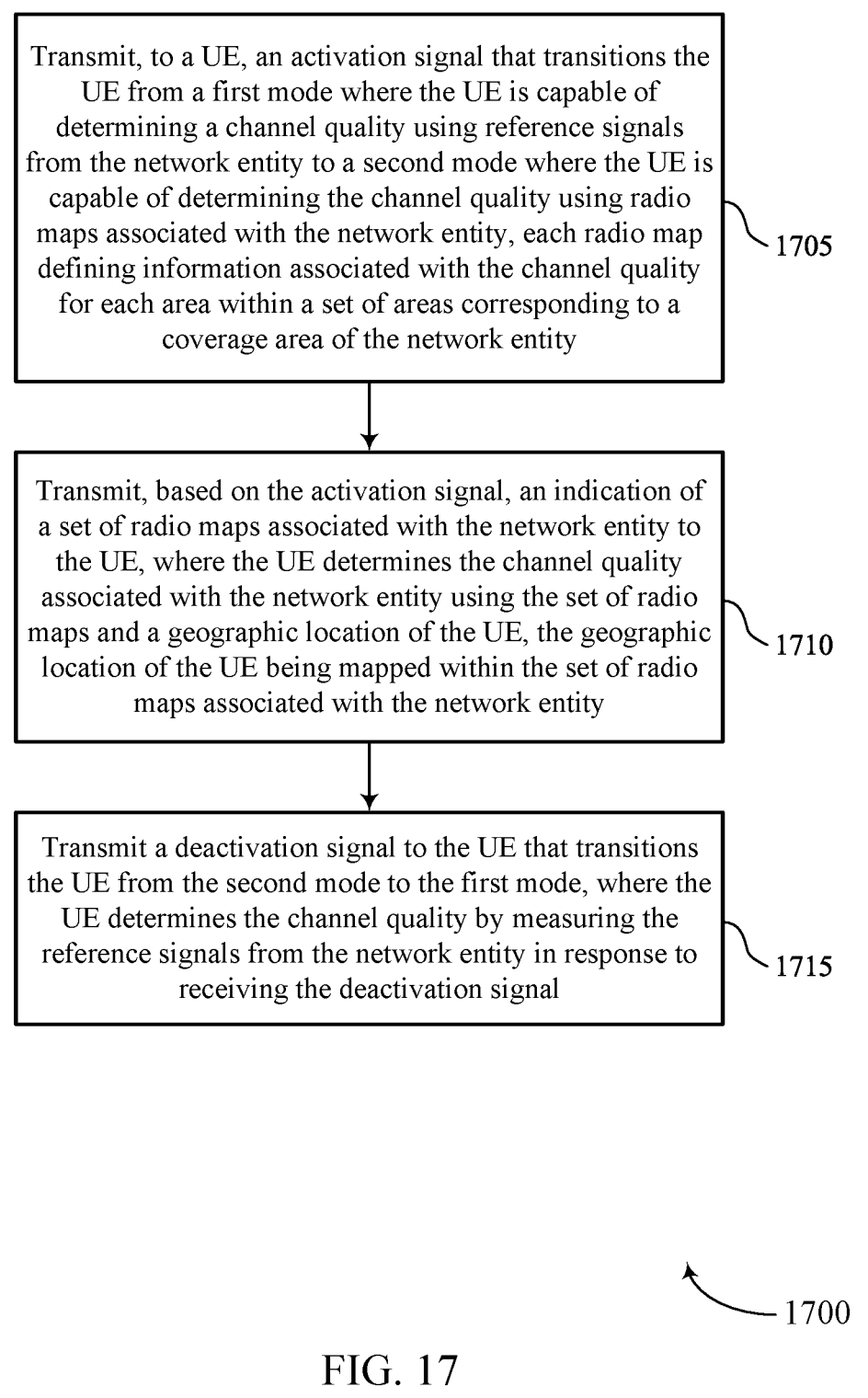

Transmit, to a UE, an activation signal that transitions the UE from a first mode where the UE is capable of determining a channel quality using reference signals from the network entity to a second mode where the UE is capable of determining the channel quality using radio maps associated with the network entity, each radio map defining information associated with the channel quality for each area within a set of areas corresponding to a coverage area of the network entity

1705

Transmit, based on the activation signal, an indication of a set of radio maps associated with the network entity to the UE, where the UE determines the channel quality associated with the network entity using the set of radio maps and a geographic location of the UE, the geographic location of the UE being mapped within the set of radio maps associated with the network entity

1710

Transmit a deactivation signal to the UE that transitions the UE from the second mode to the first mode, where the UE determines the channel quality by measuring the reference signals from the network entity in response to receiving the deactivation signal

RADIO MAP-BASED UPLINK POWER CONTROL

FIELD OF TECHNOLOGY

The following relates to wireless communications, including radio map-based uplink power control.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support radio map-based uplink power control. For example, the described techniques provide for leveraging a radio map associated with a transmitting device to determine the channel quality of a wireless channel between a user equipment (UE) and a network entity. Each radio map may convey an indication of the channel quality for each area within a set of areas. For example, the coverage area of the network entity may be divided into multiple areas. A radio map server may use various machine, artificial, or deep learning models, neural network learning models, etc., to build a radio map for the network entity. Each radio map may be associated with the network entity. A set of radio maps for the network entity may include individual radio maps for a given transmit beam of the network entity. The network entity may be associated with multiple sets of radio maps. Accordingly, the network entity may transmit an activation signal to the UE that "turns on" the radio map-based channel quality determination (e.g., transitions the UE from a first mode using reference signals to a second mode using the radio maps). The network entity may then transmit an indication of a set of radio maps for the network entity to the UE. The UE may determine the channel quality using the set of radio maps in combination with the geographical location of the UE. The geographical location of the UE defines where the UE is relative to the location of the network entity (e.g., within which area). The radio map may include an indication of information associated with the channel quality of the area where the UE is located. The UE may use that information to determine the channel quality, and then use the channel quality information when making various scheduling or configuration decisions (such as when determining uplink transmit power levels).

A method for wireless communication at a UE is described. The method may include receiving, from a network entity, an activation signal that transitions the UE from a first mode where the UE is capable of determining a channel quality using reference signals from the network entity to a second mode where the UE is capable of determining the channel quality using radio maps associated with the network entity, each radio map defines information associated with the channel quality for each area within a set of areas corresponding to a coverage area of the network entity, receiving, based on the activation signal, an indication of a set of radio maps associated with the network entity, and performing a channel performance procedure to determine the channel quality associated with the network entity using the set of radio maps and a geographic location of the UE, the geographic location of the UE being mapped within the set of radio maps associated with the network entity.

An apparatus for wireless communication at a UE is described. The apparatus may include a processor, memory coupled with the processor, and instructions stored in the memory. The instructions may be executable by the processor to cause the apparatus to receive, from a network entity, an activation signal that transitions the UE from a first mode where the UE is capable of determining a channel quality using reference signals from the network entity to a second mode where the UE is capable of determining the channel quality using radio maps associated with the network entity, each radio map defines information associated with the channel quality for each area within a set of areas corresponding to a coverage area of the network entity, receive, based on the activation signal, an indication of a set of radio maps associated with the network entity, and perform a channel performance procedure to determine the channel quality associated with the network entity using the set of radio maps and a geographic location of the UE, the geographic location of the UE being mapped within the set of radio maps associated with the network entity.

Another apparatus for wireless communication at a UE is described. The apparatus may include means for receiving, from a network entity, an activation signal that transitions the UE from a first mode where the UE is capable of determining a channel quality using reference signals from the network entity to a second mode where the UE is capable of determining the channel quality using radio maps associated with the network entity, each radio map defines information associated with the channel quality for each area within a set of areas corresponding to a coverage area of the network entity, means for receiving, based on the activation signal, an indication of a set of radio maps associated with the network entity, and means for performing a channel performance procedure to determine the channel quality associated with the network entity using the set of radio maps and a geographic location of the UE, the geographic location of the UE being mapped within the set of radio maps associated with the network entity.

A non-transitory computer-readable medium storing code for wireless communication at a UE is described. The code may include instructions executable by a processor to receive, from a network entity, an activation signal that transitions the UE from a first mode where the UE is capable of determining a channel quality using reference signals from the network entity to a second mode where the UE is capable of determining the channel quality using radio maps associated with the network entity, each radio map defines information associated with the channel quality for each area within a set of areas corresponding to a coverage area of the network entity, receive, based on the activation signal, an indication of a set of radio maps associated with the network entity, and perform a channel performance procedure to determine the channel quality associated with the network entity using the set of radio maps and a geographic location of the UE, the geographic location of the UE being mapped within the set of radio maps associated with the network entity.

Some examples of the method, apparatuses, and non-transitory computer-readable medium described herein may further include operations, features, means, or instructions for determining the channel quality according to the first mode after receiving the activation signal and prior to receiving the indication of the set of radio maps and transitioning to the second mode to determine the channel quality using the set of radio maps after receiving the indication of the set of radio maps.

Some examples of the method, apparatuses, and non-transitory computer-readable medium described herein may further include operations, features, means, or instructions for selecting an uplink transmit power for communications with the network entity based on the channel quality determined using the set of radio maps.

In some examples of the method, apparatuses, and non-transitory computer-readable medium described herein, selecting the uplink transmit power may include operations, features, means, or instructions for determining a predicted pathloss using the set of radio maps, where the channel quality may be based on the predicted pathloss.

In some examples of the method, apparatuses, and non-transitory computer-readable medium described herein, selecting the uplink transmit power may include operations, features, means, or instructions for measuring one or more reference signals from the network entity to determine a reference signal power, determining a filtered reference signal received power (RSRP) using the set of radio maps, and determining a predicted pathloss using the reference signal power and the filtered RSRP, where the channel quality may be based on the predicted pathloss.

Some examples of the method, apparatuses, and non-transitory computer-readable medium described herein may further include operations, features, means, or instructions for receiving a deactivation signal that transitions the UE from the second mode to the first mode, where the UE determines the channel quality by measuring the reference signals from the network entity in response to receiving the deactivation signal.

Some examples of the method, apparatuses, and non-transitory computer-readable medium described herein may further include operations, features, means, or instructions for receiving, from the network entity, a flag indicating that one or more radio maps in the set of radio maps associated with the network entity may have been updated, obtaining one or more updated radio maps from a radio map server in response to the flag, and transmitting an acknowledgement message to the network entity confirming receipt of the one or more updated radio maps.

In some examples of the method, apparatuses, and non-transitory computer-readable medium described herein, obtaining the one or more updated radio maps may include operations, features, means, or instructions for transmitting a request to the radio map server requesting the one or more updated radio maps, the request including an identifier associated with the network entity and receiving the one or more updated radio maps from the radio map server in response to the request.

In some examples of the method, apparatuses, and non-transitory computer-readable medium described herein, the flag may be received in a medium access control-control element (MAC-CE), the MAC-CE including an identifier associated with the network entity and the flag.

In some examples of the method, apparatuses, and non-transitory computer-readable medium described herein, the network entity may be associated with a set of multiple sets of radio maps, each radio map in the set of multiple sets of radio maps may be associated with an identifier of the network entity and a beam identifier associated with the network entity.

In some examples of the method, apparatuses, and non-transitory computer-readable medium described herein, the activation signal may be received in an uplink power control information element (IE) of a radio resource control (RRC) signal and the indication of the set of radio maps may be received in a MAC-CE.

A method for wireless communication at a network entity is described. The method may include transmitting, to a UE, an activation signal that transitions the UE from a first mode where the UE is capable of determining a channel quality using reference signals from the network entity to a second mode where the UE is capable of determining the channel quality using radio maps associated with the network entity, each radio map defining information associated with the channel quality for each area within a set of areas corresponding to a coverage area of the network entity and transmitting, based on the activation signal, an indication of a set of radio maps associated with the network entity to the UE, where the UE determines the channel quality associated with the network entity using the set of radio maps and a geographic location of the UE, the geographic location of the UE being mapped within the set of radio maps associated with the network entity.

An apparatus for wireless communication at a network entity is described. The apparatus may include a processor, memory coupled with the processor, and instructions stored in the memory. The instructions may be executable by the processor to cause the apparatus to transmit, to a UE, an activation signal that transitions the UE from a first mode where the UE is capable of determining a channel quality using reference signals from the network entity to a second mode where the UE is capable of determining the channel quality using radio maps associated with the network entity, each radio map defining information associated with the channel quality for each area within a set of areas corresponding to a coverage area of the network entity and transmit, based on the activation signal, an indication of a set of radio maps associated with the network entity to the UE, where the UE determines the channel quality associated with the network entity using the set of radio maps and a geographic location of the UE, the geographic location of the UE being mapped within the set of radio maps associated with the network entity.

Another apparatus for wireless communication at a network entity is described. The apparatus may include means for transmitting, to a UE, an activation signal that transitions the UE from a first mode where the UE is capable of determining a channel quality using reference signals from the network entity to a second mode where the UE is capable of determining the channel quality using radio maps associated with the network entity, each radio map defining information associated with the channel quality for each area within a set of areas corresponding to a coverage area of the network entity and means for transmitting, based on the activation signal, an indication of a set of radio maps associated with the network entity to the UE, where the UE determines the channel quality associated with the network entity using the set of radio maps and a geographic location of the UE, the geographic location of the UE being mapped within the set of radio maps associated with the network entity.

A non-transitory computer-readable medium storing code for wireless communication at a network entity is described. The code may include instructions executable by a processor to transmit, to a UE, an activation signal that transitions the UE from a first mode where the UE is capable of determining a channel quality using reference signals from the network entity to a second mode where the UE is capable of determining the channel quality using radio maps associated with the network entity, each radio map defining information associated with the channel quality for each area within a set of areas corresponding to a coverage area of the network entity and transmit, based on the activation signal, an indication of a set of radio maps associated with the network entity to the UE, where the UE determines the channel quality associated with the network entity using the set of radio maps and a geographic location of the UE, the geographic location of the UE being mapped within the set of radio maps associated with the network entity.

Some examples of the method, apparatuses, and non-transitory computer-readable medium described herein may further include operations, features, means, or instructions for transmitting a deactivation signal to the UE that transitions the UE from the second mode to the first mode, where the UE determines the channel quality by measuring the reference signals from the network entity in response to receiving the deactivation signal.

Some examples of the method, apparatuses, and non-transitory computer-readable medium described herein may further include operations, features, means, or instructions for receiving, from a radio map server, an indication that one or more radio maps in the set of radio maps associated with the network entity may have been updated, transmitting a flag set to indicate that the one or more radio maps in the set of radio maps associated with the network entity may have been updated, receiving an acknowledgement message from the UE confirming receipt of updated radio maps, and resetting the flag based on the acknowledgement message.

In some examples of the method, apparatuses, and non-transitory computer-readable medium described herein, the flag may be transmitted in a MAC-CE, the MAC-CE including an identifier associated with the network entity and the flag.

In some examples of the method, apparatuses, and non-transitory computer-readable medium described herein, the network entity may be associated with a set of multiple sets of radio maps, each radio map in the set of multiple sets of radio maps may be associated with an identifier of the network entity and a beam identifier associated with the network entity.

In some examples of the method, apparatuses, and non-transitory computer-readable medium described herein, the activation signal may be transmitted in an uplink power control IE of an RRC signal and the indication of the set of radio maps may be transmitted in a MAC-CE.

BRIEF DESCRIPTION OF THE DRAWINGS

FIGS. 13 through 17 illustrate flowcharts showing methods that support radio map-based uplink power control in accordance with one or more aspects of the present disclosure.

DETAILED DESCRIPTION

Figure 1:
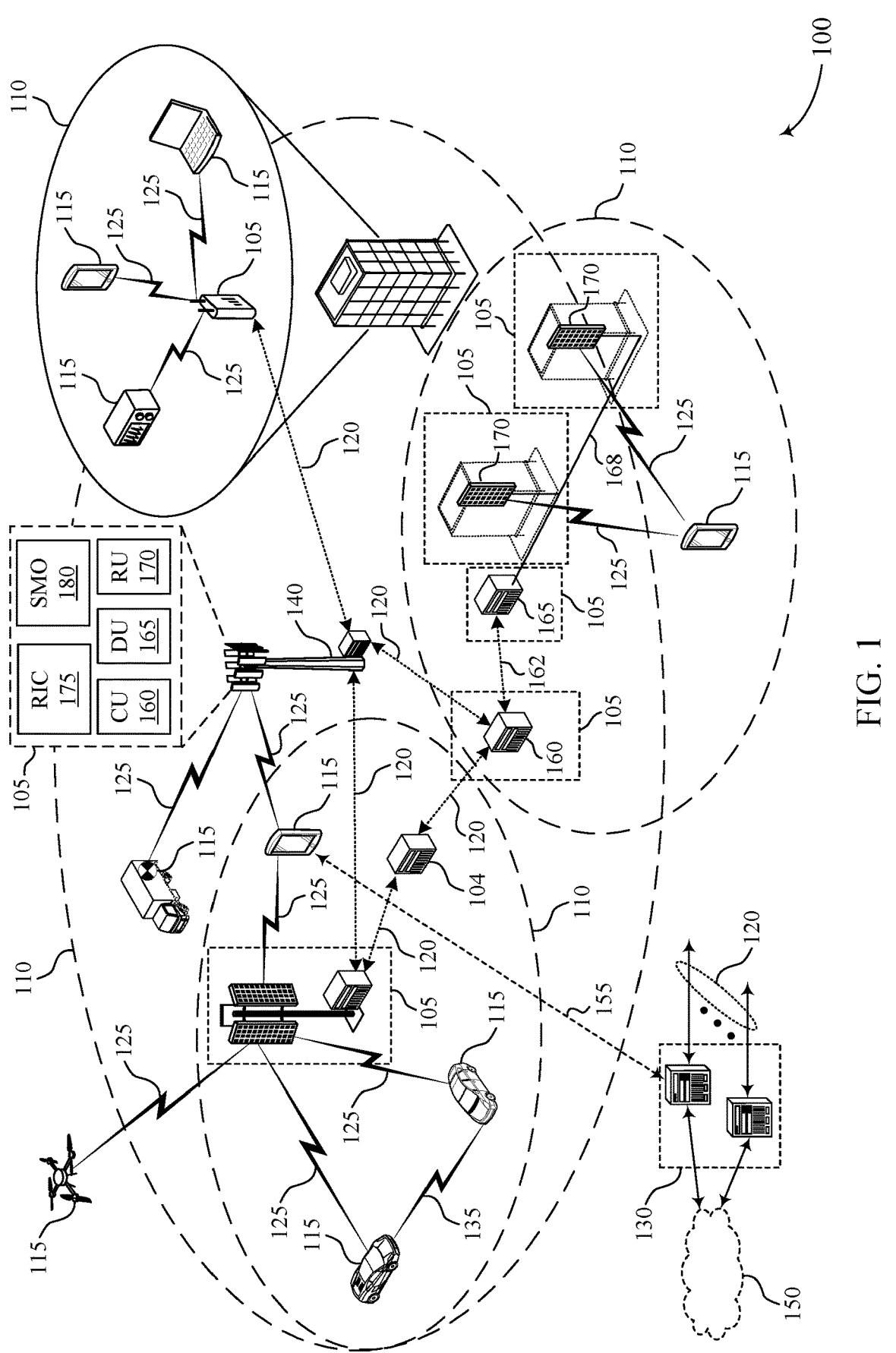
FIG. 1 illustrates an example of a wireless communications system that supports radio map-based uplink power control in accordance with one or more aspects of the present disclosure.

Wireless networks generally rely on reference signal transmissions to determine the quality of a channel performance determination. For example, a network entity may transmit signals over a wireless medium between the network entity and a user equipment (UE). The UE may measure the signals to determine the quality of the wireless channel. The UE may report the channel quality to the network entity where the network entity and/or UE may use the channel quality information to make various scheduling and/or configuration decisions, such as determining a network interference level, a network congestion level, and so forth. However, such techniques are generally resource intensive as the reference signal information must be selected, configured, and indicated to the UE. Moreover, measuring the reference signals to determine the channel quality interferes with wireless communications between the UE and network. These measuring techniques may be inaccurate due to such factors as UE mobility, noisy channels, and the like.

Accordingly, aspects of the techniques described herein provide more efficient channel performance measurement and reporting procedures based radio maps associated with a network entity. These techniques leverage a radio map associated with a transmitting device (e.g., the network entity or any other wireless device) to determine the channel quality of a wireless channel between a UE and a network entity. Each radio map may convey an indication of the channel quality for each area within a set of areas. For example, the coverage area of the network entity may be divided into multiple areas. A radio map server may build a radio map for the network entity. Each radio map may be associated with the network entity. A set of radio maps for the network entity may include individual radio maps for a given transmit beam of the network entity. The network entity may be associated with multiple sets of radio maps. The network entity may transmit an activation signal to the UE that "turns on" the radio map-based channel quality determination (e.g., transitions the UE, or prepares the UE to transition, from a first mode using reference signals to a second mode using the radio maps). The network entity may then transmit an indication of a set of radio maps for the network entity to the UE. The UE may determine the channel quality using the set of radio maps in combination with the geographical location of the UE. The geographical location of the UE defines where the UE is relative to the location of the network entity (e.g., within which area). The radio map may include an indication of information associated with the channel quality of the area where the UE is located. The UE may use that information to determine the channel quality, and then use the channel quality information when making various scheduling or configuration decisions (such as when determining uplink transmit power levels).

Particular aspects of the subject matter described in this disclosure may be implemented to realize one or more of the following potential advantages. Relying strictly on reference signal-based channel estimation and reporting techniques may be inefficient and, in some scenarios, inaccurate. The reference signals must be selected, then configured, then indicated to the UE, and then transmitted to the UE where the UE measures the reference signals to estimate the pathloss. While these techniques may be useful for some scenarios, other scenarios may not require such extensive signaling and processing. Accordingly, usage of the radio maps for channel estimation as described herein results in a significant resource utilization reductions be reducing the amount of signaling required to support channel estimation, thus improving spectral efficiency. Using the radio maps for channel estimation further greatly improves the timing efficiency of channel estimation when compared to reference signal-based channel estimation.

Aspects of the disclosure are initially described in the context of wireless communications systems. Aspects of the disclosure are further illustrated by and described with reference to apparatus diagrams, system diagrams, and flowcharts that relate to radio map-based uplink power control.

FIG. 1 illustrates an example of a wireless communications system 100 that supports radio map-based uplink power control in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125

(e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 via an interface (e.g., a backhaul link). IAB donor and IAB nodes 104 may communicate via an F1 interface according to a protocol that defines signaling messages (e.g., an F1 AP protocol). Additionally, or alternatively, the CU 160 may communicate with the core network via an interface, which may be an example of a portion of backhaul link, and may communicate with other CUs 160 (e.g., a CU 160 associated with an alternative IAB donor) via an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node, or referred to as a child IAB node associated with an IAB donor, or both. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through IAB nodes 104, or may directly signal transmissions to a UE 115, or both. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling via an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support radio map-based uplink power control as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IOT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing (Δf) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s = 1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID), or others). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate using the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications via the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may support synchronous or asynchronous operation. For synchronous operation, network entities 105 (e.g., base stations 140) may have similar frame timings, and transmissions from different network entities 105 may be approximately aligned in time. For asynchronous operation, network entities 105 may have different frame timings, and transmissions from different network entities 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 include entering a power saving deep sleep mode when not engaging in active communications, operating using a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may also operate using a super high frequency (SHF) region, which may be in the range of 3 GHz to 30 GHz, also known as the centimeter band, or using an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multipanel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

A UE 115 may receive, from a network entity 105, an activation signal that transitions the UE 115 from a first mode where the UE 115 is capable of determining a channel quality using reference signals from the network entity 105 to a second mode where the UE 115 is capable of determining the channel quality using radio maps associated with the network entity 105, each radio map defines information associated with the channel quality for each area within a set of areas corresponding to a coverage area of the network entity 105. The UE 115 may receive, based at least in part on the activation signal, an indication of a set of radio maps associated with the network entity 105. The UE 115 may perform a channel performance procedure to determine the channel quality associated with the network entity 105 using the set of radio maps and a geographic location of the UE 115, the geographic location of the UE 115 being mapped within the set of radio maps associated with the network entity 105.

Figure 2:
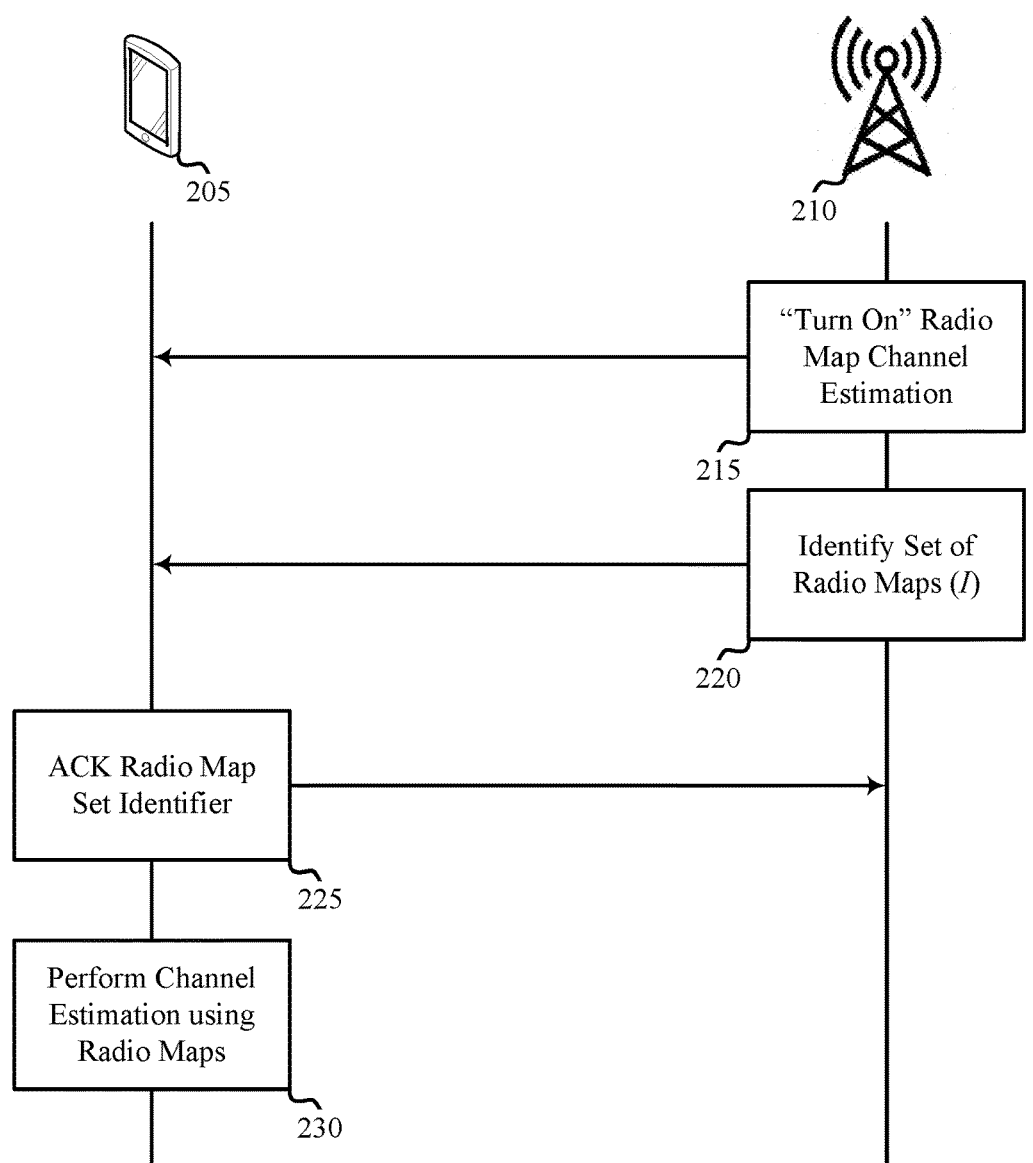
FIG. 2 illustrates an example of a process that supports radio map-based uplink power control in accordance with one or more aspects of the present disclosure.

A network entity 105 may transmit, to a UE 115, an activation signal that transitions the UE 115 from a first mode where the UE 115 is capable of determining a channel quality using reference signals from the network entity 105 to a second mode where the UE 115 is capable of determining the channel quality using radio maps associated with the network entity 105, each radio map defining information associated with the channel quality for each area within a set of areas corresponding to a coverage area of the network entity 105. The network entity 105 may transmit, based at least in part on the activation signal, an indication of a set of radio maps associated with the network entity 105 to the UE 115, wherein the UE 115 determines the channel quality associated with the network entity 105 using the set of radio maps and a geographic location of the UE 115, the geographic location of the UE 115 being mapped within the set of radio maps associated with the network entity FIG. 2 illustrates an example of a process 200 that supports radio map-based uplink power control in accordance with one or more aspects of the present disclosure. Process 200 may implement aspects of wireless communications system 100. Aspects of process 200 may be implemented at or implemented by a UE 205 and/or a network entity 210, which may be examples of the corresponding devices described herein. In some aspects, the network entity 210 may be a serving cell of the UE 205.

Wireless communication systems generally rely on various channel performance characteristics to evaluate the capability or performance of the wireless channel between a transmitting device and a receiving device. The channel performance characteristics are then leveraged when making various scheduling and/or configuration decisions by the wireless nodes. One such example may include the uplink transmit power level of the UE 205. Conventional uplink transmit power control schemes may include the UE 205 transmitting uplink signals at a transmit power level that achieves a desired signal-to-interference-plus-noise ratio (SINR) (e.g., to determine the theoretical upper bounds on the channel capacity of the wireless channel) at the network entity 210. The SINR of the received uplink signal is dependent upon the transmit power level used for the uplink transmission and the pathloss of the wireless channel over which the transmission travels. The uplink transmit power level is selected in view of the pathloss of the wireless channel and the desired SINR at the receiver. When the pathloss increases, the UE 205 may increase its transmit power level to compensate (e.g., to maintain the desired SINR at the receiver). When the pathloss decreases, the UE 205 may decrease its transmit power level to compensate (e.g., again, to maintain the desired SINR at the receiver).

The pathloss of the wireless channel is determined based on a channel performance measurement and reporting procedure. This may include the network entity 210 selecting and configuring reference signal(s) for the UE 205 to measure, reporting the reference signal configurations to the UE 205, and then transmitting the reference signals to the UE 205 according to the configurations. The UE 205 measures the reference signals to determine various channel performance characteristics (e.g., the pathloss), based on factors such as a reference signal received power (RSRP) level, a reference signal strength indication (RSSI), a channel quality indicator (CQI), or others. The UE 205 may compute the pathloss of the wireless channel based on the channel performance characteristics. In some examples, this may be based on the following formula:

$$PL_{b,f,c}(q_d)=\text{referenceSignalPower}-\text{higherlayer filtered RSRP}$$

where the referenceSignalPower is provided by higher layers signaling (e.g., RRC or IP layers) and the RSRP (e.g., the higher layer filtered RSRP) is defined for the reference serving cell and the higher layer filtered configuration provided by the QuantityConfig defined for the reference serving cell. This mode of channel estimation may be referred to as a first mode. However, such techniques are resource usage intensive, requiring extensive signaling to configure the reference signals, transmit the reference signals, transmit the results of the channel measurements, and so forth. Moreover, such techniques may be inaccurate due to noisy observations of the reference signal, mobility of the UE 205, among other factors.

Radio maps define pathloss information for a geographical coverage area of a transmitting device, such as the network entity 210. This may include a radio user net (RadioUNet) performing supervised training of a user net (UNet), such as a wireless communications network. This may include taking as input a geographical map and the location of the transmitter and providing as output an indication of the pathloss at each location in the map. A radio map may refer to an image, map, representation, or other information showing the pathloss between the transmitter at geographic location (x) and each receiving device at geographic location (y), which may be given by the large-scale attenuation factor G(x,y). The RadioUNet may apply various deep learning models (e.g., neural networks learning, artificial intelligence (AI) learning, machine learning, or other learning models) to estimate the radio maps for a given transmitting device, such as the network entity 210 in this non-limiting example.

As one non-limiting example, a radio map may use or show a 256×256 square meter area (e.g., some or all of the coverage area of the network entity 210) divided into squares of one square meter. Inputs to the map may include a building or other solid structure where the indication is set to one and where the transmitter is located may also be set to one (e.g., to indicate no possible coverage within the square). The output of the radio map may include each one square meter being assigned an integral of the pathloss over that square. The output may be scaled to between [0,1] (e.g., gray level) via min-max correlation. Accordingly, each geographic location (e.g., one square meter) within the radio map may have a corresponding number between zero and one, with ones indicating the location of a solid structure, the transmitting device, or other positions where the signal from the transmitter is otherwise not receivable (e.g., due to blockage). Numbers less than one may provide an indication of the expected pathloss for a receiving device located within the square.

Accordingly, aspects of the techniques described herein use radio maps associated with a transmitting device, such as the network entity 210, to support pathloss determination by the UE 205. The radio map-based channel performance evaluation may be applied instead of reference signal-based channel performance estimation, or in combination with reference signal-based channel performance estimation.

This may include at 215 the network entity 210 transmitting or otherwise providing (and the UE 205 receiving or otherwise obtaining) an activation signal. The activation signal may transitions the UE 205 between, or activates/deactivates both, a first mode where the UE 205 is capable of determining the channel quality (e.g., a predicted pathloss) using reference signals (e.g., the reference signal-based channel performance estimation mode) and a second mode where the UE 205 is capable of determining the channel quality using radio maps associated with the network entity 210. As discussed above, each radio map may generally define information (e.g., [0,1]) associated with the channel quality (e.g., pathloss) of an area (e.g., one square meter, in this non-limiting example) of a set of areas (e.g., 256×256 square meter area, in this non-limiting example). The set of areas may generally correspond to the coverage area of the network entity 210.

In some aspects, the set of areas may be based on a transmit beam of the network entity 210. For example, a transmit beam of the network entity 210 may provide for transmissions over a defined coverage area of the network entity 210, but not necessarily the complete coverage area of the network entity 210 provided using multiple transmit beams. Accordingly, the set of radio maps may be for a given transmit beams of the network entity 210 and, therefore, the areas within the radio maps in the set would correspond to the coverage area of the transmit beam associated with the set.

The activation signal may be used to "turn on" or "turn off" the first mode and/or second mode for the UE 205. The activation signal may include flag(s), bit(s), field(s), or other information (explicitly or implicitly conveyed) set to indicate "activation" or "deactivation" for the first mode and/or the second mode. The activation signal may be an RRC signal, a medium access control-control element (MAC-CE), or a downlink control information (DCI) signal. In some examples, the activation signal may be indicated in an uplink power control information element (IE) of a RRC signal.

In some examples, the UE 205 may be (pre-)configured with the radio maps for the network entity 210 (e.g., during a (re)connection procedure, in response to a request, and/or upon a determination that the network entity 210 supports using radio maps). The UE 205 may communicate with a radio map server to determine the set(s) of radio maps associated with the network entity 210. The UE 205 may be configured with sets of neural network-produced radio maps (e.g., from a core network based and/or a non-core network based radio map server, such as RadioUNet) for the network entity 210.

In some examples, multiple sets of radio maps may be associated with the network entity 210, where each set of radio maps may be for a given transmit beam of the network entity 210. In some examples, each radio map may be associated with the network entity 210 via an identifier or index of the network entity 210. In the examples where different sets of radio maps are provided on a per-beam basis, the radio maps in each set may be associated with the identifier or index of the network entity 210 as well as the beam identifier for the set. Different sets of radio maps may be differentiated by different beam identifiers, but each radio map in the sets having the same identifier or index of the network entity 210. Each set of radio maps may be associated with a radio map set index or identifier, e.g., I∈[N].

At 220 and after the activation signal is provided, the network entity 210 may transmit or otherwise provide (and the UE 205 may receive or otherwise obtain) an indication of a set of radio maps associated with the network entity 210. That is, after "RRC turn on," the network entity 210 may signal the radio map set index/to the UE 205 (e.g., via MAC-CE).

At 225, the UE 205 may transmit or otherwise provide (and the network entity 210 may receive or otherwise obtain) an acknowledgement (ACK) message confirming that the UE 205 has successfully received and decoded the identifier of the set of radio maps to be used for pathloss determination.

Confirmation of the indication of the identifier of the set of radio maps (e.g., via the ACK message) may serve as the signal for the UE 205 to begin using the set of radio maps in predicting pathloss (e.g., to, at 230, begin performing the channel estimation procedure using the radio map(s) in the set of radio maps according to the second mode). That is, prior to receiving the indication of the set of radio maps (e.g., after receiving the activation signal), the UE 205 may continue to operate in the first mode using reference signal-based channel estimation. After receiving the indication of the set of radio maps from the network entity 210, the UE 205 may transition to the second mode where the UE uses the set of radio maps to determine the channel quality. Thus, between "RRC turn on" (e.g., the activation signal) and the MAC-CE (e.g., the identifier of the set of maps), the reference signal power (e.g., referenceSignalPower) and the higher layer filtered RSRP may continue to be measured using the indicated (e.g., (pre-)configured) reference signal). This first mode of operation may be used to determine various parameters, such as the uplink transmit power of the UE 205.

However, after the identifier of the set of radio maps is received the UE 205 may transition to the second mode and begin performing a channel performance procedure to determine the channel quality (e.g., pathloss) associated with the network entity 210. More particularly, the UE 205 may be located at a given geographical area that is within an area of the set of areas (e.g., within a particular one square meter of a 256×256 square meter grid corresponding to some or all of the coverage area of the network entity 210, in a non-limiting example). The geographic location of the UE 205 may be given by (x, y, z,), corresponding to the coordinates of the UE 205. The UE 205 may use its geographic location mapped within the set of radio maps and the information conveyed in the radio maps (e.g., [0,1]) to determine a predicted pathloss for the network entity 210. The UE 205 may use the predicted pathloss to determine various scheduling and/or configuration decisions, such as selecting an uplink transmit power for communications with the network entity 210 based on the channel quality determined using the set of radio maps.

As discussed, the radio maps may be implemented by a neural network $f_\theta$ that map the position of the UE 205 to the pathloss for that position. Different examples may be considered for the UE 205 to use the radio maps to determine the predicted pathloss, and thus determine its uplink transmit power level. Again, the pathloss may be based on the reference signal power (referenceSignalPower) and the higher layer filtered RSRP. In one example, the pathloss information (e.g., [0,1]) indicated in the radio map may be used as the predicted pathloss. In this example $f_\theta(x, y, z;$ cell_idx; beam_idx)=predicted pathloss (e.g., R(x, y, z; cell_idx; beam_idx), where R refers to the pathloss information indicated in a radio map, the cell_idx refers to the index or identifier of the cell, such as the network entity 210 in this example, and the beam_idx refers to the index or identifier of the transmit beam associated with the set of radio maps. That is, the channel quality (e.g., pathloss) is determined using the predicted pathloss information indicated in the radio map and the geographic location of the UE 205 (e.g., R(x, y, z; cell_idx; beam_idx), in this example.

Another example may include the UE 205 using the pathloss information indicated in the radio map as the higher layer filtered RSRP value and measuring reference signals from the network entity 210 to determine the reference signal power (e.g., referenceSignalPower). Accordingly, the UE 205 may measure the reference signal(s) from the network entity 210 to identify or otherwise determine the reference signal power and use the radio maps in the set of radio maps to determine the filtered RSRP (e.g., the higher layer filtered RSRP). In this example, the UE 205 may determine the predicted pathloss using the measured reference signal power and the filtered RSRP. That is, in this example $f_\theta(x, y, z;$ cell_idx; beam_idx)=predicted "high layer filtered RSRP". Hence, in this example the predicted pathloss may be PL=referenceSignalPower−$f_\theta(x, y, z;$ cell_idx; beam_idx).

Accordingly, the network entity 210 may have an associated multiple sets of radio maps identifying pathloss values or information for some or all of the areas within its coverage area, with each set corresponding to different transmit beams of the network entity 210. The network entity 210 may activate use of the radio maps for channel quality determination at the UE 205 and then indicate which set of radio maps for the UE 205 to use. The UE 205 may begin performing channel estimation using the radio maps after confirming that the identifier of the set of radio maps has been received. The UE 205 may use the channel estimation determined using the set of radio maps to determine its uplink transmit power, as well as other scheduling and/or configuration determinations. The network entity 210 may also leverage the location of the UE 205 in combination with its associated radio maps to predict the pathloss of the UE 205.

Figure 3:
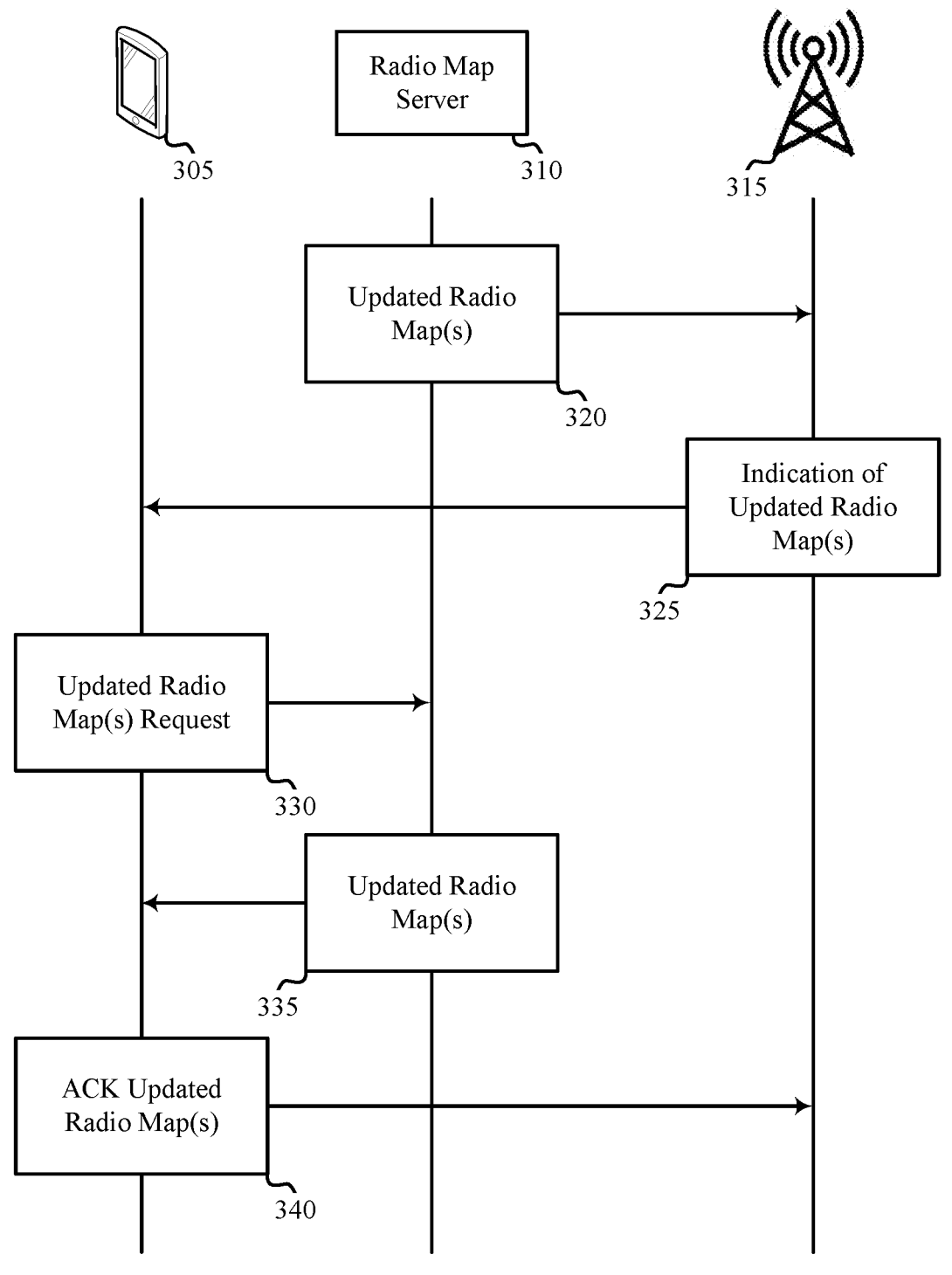
FIG. 3 illustrates an example of a process that supports radio map-based uplink power control in accordance with one or more aspects of the present disclosure.

FIG. 3 illustrates an example of a process 300 that supports radio map-based uplink power control in accordance with one or more aspects of the present disclosure. Process 300 may implement aspects of wireless communications system 100 and/or aspects of process 200. Aspects of process 300 may be implemented at or implemented by a UE 305, a radio map server 310, and/or a network entity 315, which may be examples of the corresponding devices described herein. In some aspects, the network entity 315 may be a serving cell of the UE 305.

As discussed above, aspects of the techniques described herein provide for use of radio maps of the network entity 315 to determine a pathloss value. The network entity 315 may transmit an activation signal to the UE 305. The activation signal (e.g., RRC signal) is used to activate or otherwise prepare the UE 305 to transition to/from or between a first mode and a second mode of determining channel quality using radio maps or reference signals. The network entity 315 may transmit an indication of a set of radio maps to the UE 305 associated with the network entity 315, such as an identifier or index associated with the set of radio maps. The set of radio maps may be for a given transmit beam of the network entity 315, in some examples. The UE 305 may acknowledge successful receipt and decoding of the identifier of the set of radio maps and, in response, transition to the second mode where the radio maps are used for channel quality determination, as well as the resulting scheduling and/or configuration decisions adopted based on the channel quality.

The radio maps may be developed and/or updated by the radio map server 310, which may be a part of the core network (e.g., a 3GPP entity) or outside of the core network (e.g., a non-3GPP entity), such as being implemented via a UE vendor, a chipset vendor, a network vendor, a network operator, a private network owner, a positioning ser vice provide, or any other 3rd party entity. The radio map server 310 may generally train and/or update of $f_\theta$. When the network entity 315 updates $f_\theta$, it communicates that $f_\theta$ is updated to the network entity 315, which sets a flag to indicate to the UE 305 that one or more of the radio maps has been updated. Process 300 illustrates a non-limiting example of updating the radio map(s) within a wireless network.

At 320, the radio map server 310 may transmit or otherwise provide (and the network entity 315 may receive or otherwise obtain) an indication that radio map(s) associated with the network entity 315 have been updated. For example, the radio map server 310 may provide the indication to the network entity 315 using one or more IP based signaling protocols via a core network associated with the network entity 315.

At 325, the network entity 315 may transmit or otherwise provide (and the UE 305 may receive or otherwise obtain) an indication (e.g., a flag) that radio map(s) in the set of radio maps associated with the network entity 315 have been updated. For example, the network entity 315 may maintain a binary flag b that denotes whether or not radio maps associated with the network entity 315 and that are being used by the UE 305 have been updated. If b=1, the network entity 315 may transmit a MAC-CE to the UE 305 indicating that new radio map(s) are available to the UE 305. In some aspects, this may include the network entity 315 determining, based on the indication received at 320, that the UE 305 is using (or capable of using) updated radio map(s) of the network entity 315. When the UE 305 is determined to be using an updated radio map, the network entity 315 may set the flag (e.g., b=1) in the MAC-CE to alert the UE 305 to the updated radio maps.

In response to the indication of the updated radio maps, at 330 the UE 305 may transmit or otherwise provide (and the radio map server 310 may receive or otherwise obtain) a request for the updated radio map(s). This may include the UE 305 transmitting the request to the network entity 315, which forwards the request to the radio map server 310 via the core network. In some examples, the request may carried or otherwise provided in an IP-based message. In some examples, the request may carry or otherwise convey an indication of the identifier or index of the network entity 315. Accordingly, on receipt of the message at 325, the UE 305 may provide the cell identifier or index to the radio map server 310 (S), which transmits the R's (e.g., the updated radio map(s)) to the UE 305.

At 335, the radio map server 310 may transmit or otherwise provide (and the UE 305 may receive or otherwise obtain) the updated radio map(s) from the radio map server 310 (e.g., may receive the R's). The UE 305 may replace the radio maps currently being used with the updated radio maps for channel estimation. Again, the updated radio map(s) may be received by the UE 305 via the network entity 315.

At 340, the UE 305 may transmit or otherwise provide (and the network entity 315 may receive or otherwise obtain) an acknowledgement message confirming receipt of the updated radio map(s). That is, once the UE 305 successfully downloads the updated radio maps (e.g., R's) form the radio map server 310, the UE 305 sends an ACK message indicating that the radio map(s) have been successfully downloaded from the radio map server 310. In response, the network entity 315 may reset the flag in the MAC-CE to zero (e.g., b=0) to indicate that the radio maps being used by the UE 305 are current (e.g., the network entity 315 lowers the flag indicating for the UE 305 to update its radio map(s)).

Figure 4:
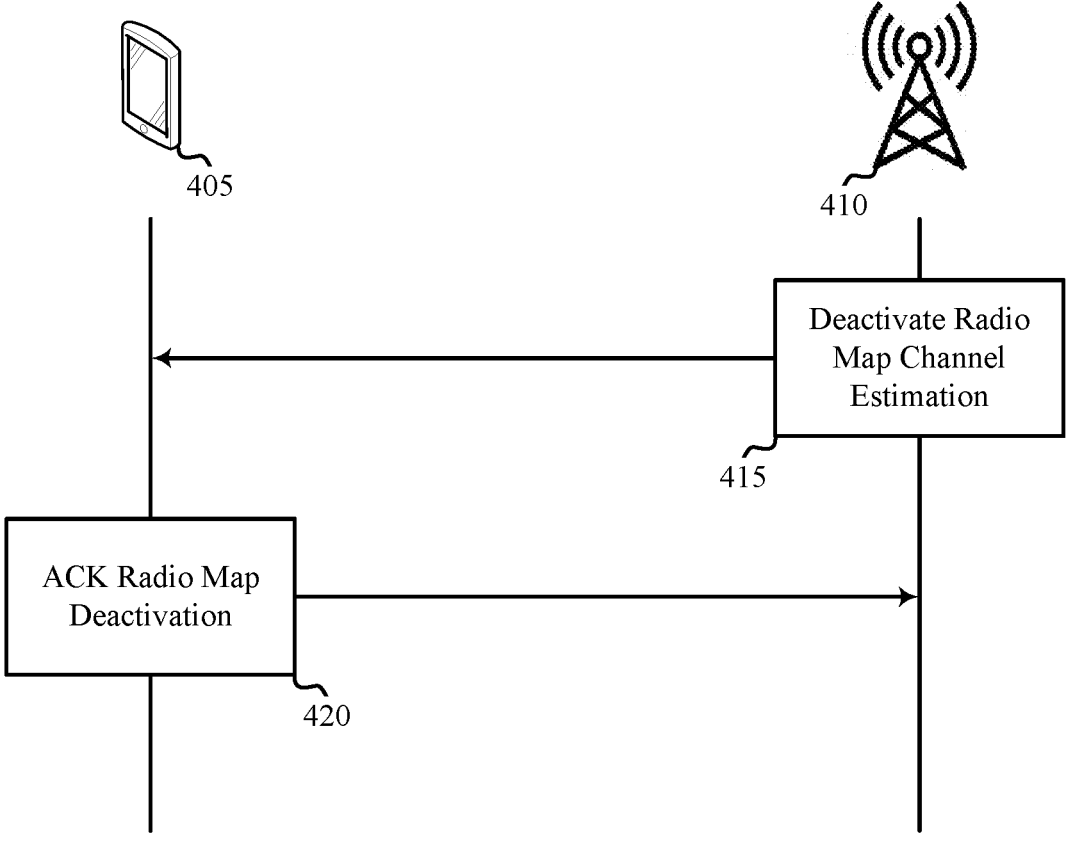
FIG. 4 illustrates an example of a process that supports radio map-based uplink power control in accordance with one or more aspects of the present disclosure.

FIG. 4 illustrates an example of a process 400 that supports radio map-based uplink power control in accordance with one or more aspects of the present disclosure. Process 400 may implement aspects of wireless communications system 100 and/or aspects of processes 200 and/or 300. Aspects of process 400 may be implemented at or implemented by a UE 405 and/or a network entity 410, which may be examples of the corresponding devices described herein. In some aspects, the network entity 410 may be a serving cell of the UE 405.

As discussed above, aspects of the techniques described herein provide for use of radio maps of the network entity 410 to determine a pathloss value. The network entity 410 may transmit an activation signal to the UE 405. The activation signal (e.g., RRC signal) is used to activate or otherwise prepare the UE 405 to transition to/from or between a first mode and a second mode for determining channel quality using radio maps or reference signals. The network entity 410 may transmit an indication of a set of radio maps to the UE 405 associated with the network entity 410, such as an identifier or index associated with the set of radio maps. The set of radio maps may be for a given transmit beam of the network entity 410, in some examples. The UE 405 may acknowledge successful receipt and decoding of the identifier of the set of radio maps and, in response, transition to the second mode where the radio maps are used for channel quality determination, as well as the resulting scheduling and/or configuration decisions adopted based on the channel quality.

Process 400 illustrates a non-limiting example of deactivating use of the radio map(s) for channel estimation. Process 400 assumes that the UE 405 has either received the activation message, but not yet transitioned to the second mode, or has transitioned to the second mode and is using a set of radio maps for channel estimation (e.g., to determine the pathloss, which is used to determine an uplink transmit power level.

At 415, the network entity 410 may transmit or otherwise provide (and the UE 405 may receive or otherwise obtain) a deactivation message that transitions the UE 405 from the second mode to the first mode where the UE 405 begins using reference signals (pre-)configured for the UE 405 for channel estimation. In response to receiving the deactivation message (e.g., via RRC signaling), the UE 405 may transition to the first mode and determines the channel quality (e.g., pathloss) using reference signals from the network entity 410.

At 420, the UE 405 may transmit or otherwise provide (and the network entity 410 may receive or otherwise obtain) an acknowledgement message confirming that the UE 405 has successfully received and decoded the deactivation message.

Figure 5:
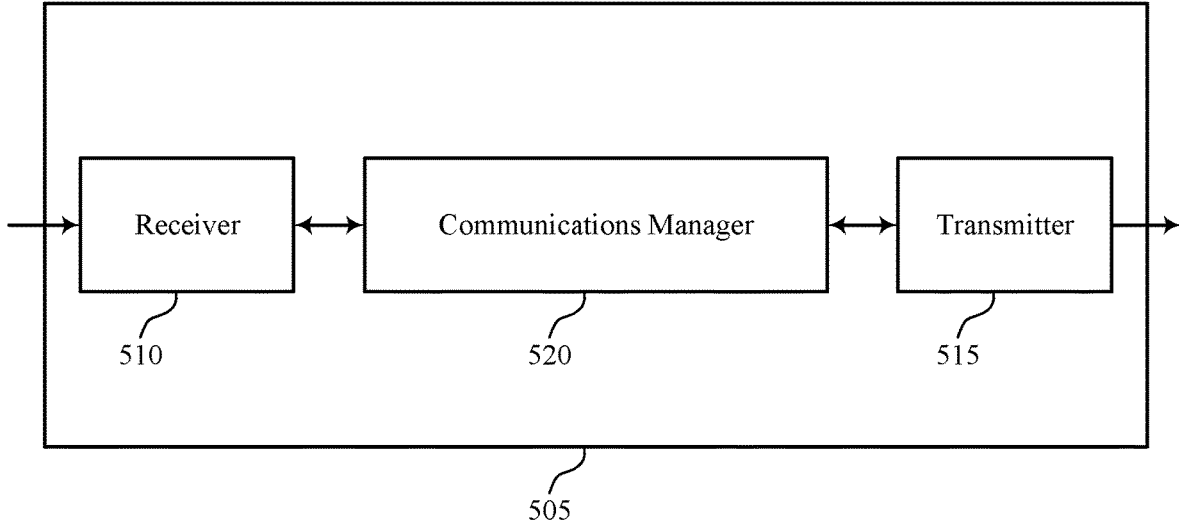
FIGS. 5 and 6 illustrate block diagrams of devices that support radio map-based uplink power control in accordance with one or more aspects of the present disclosure.

FIG. 5 illustrates a block diagram 500 of a device 505 that supports radio map-based uplink power control in accordance with one or more aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to radio map-based uplink power control). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to radio map-based uplink power control). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of radio map-based uplink power control as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 520 may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

The communications manager 520 may support wireless communication at a UE in accordance with examples as disclosed herein. For example, the communications manager 520 may be configured as or otherwise support a means for receiving, from a network entity, an activation signal that transitions the UE from a first mode where the UE is capable of determining a channel quality using reference signals from the network entity to a second mode where the UE is capable of determining the channel quality using radio maps associated with the network entity, each radio map defines information associated with the channel quality for each area within a set of areas corresponding to a coverage area of the network entity. The communications manager 520 may be configured as or otherwise support a means for receiving, based on the activation signal, an indication of a set of radio maps associated with the network entity. The communications manager 520 may be configured as or otherwise support a means for performing a channel performance procedure to determine the channel quality associated with the network entity using the set of radio maps and a geographic location of the UE, the geographic location of the UE being mapped within the set of radio maps associated with the network entity.

By including or configuring the communications manager 520 in accordance with examples as described herein, the device 505 (e.g., a processor controlling or otherwise coupled with the receiver 510, the transmitter 515, the communications manager 520, or a combination thereof) may support techniques for improving channel estimation procedure using radio maps to determine an uplink transmit power of a UE.

Figure 6:
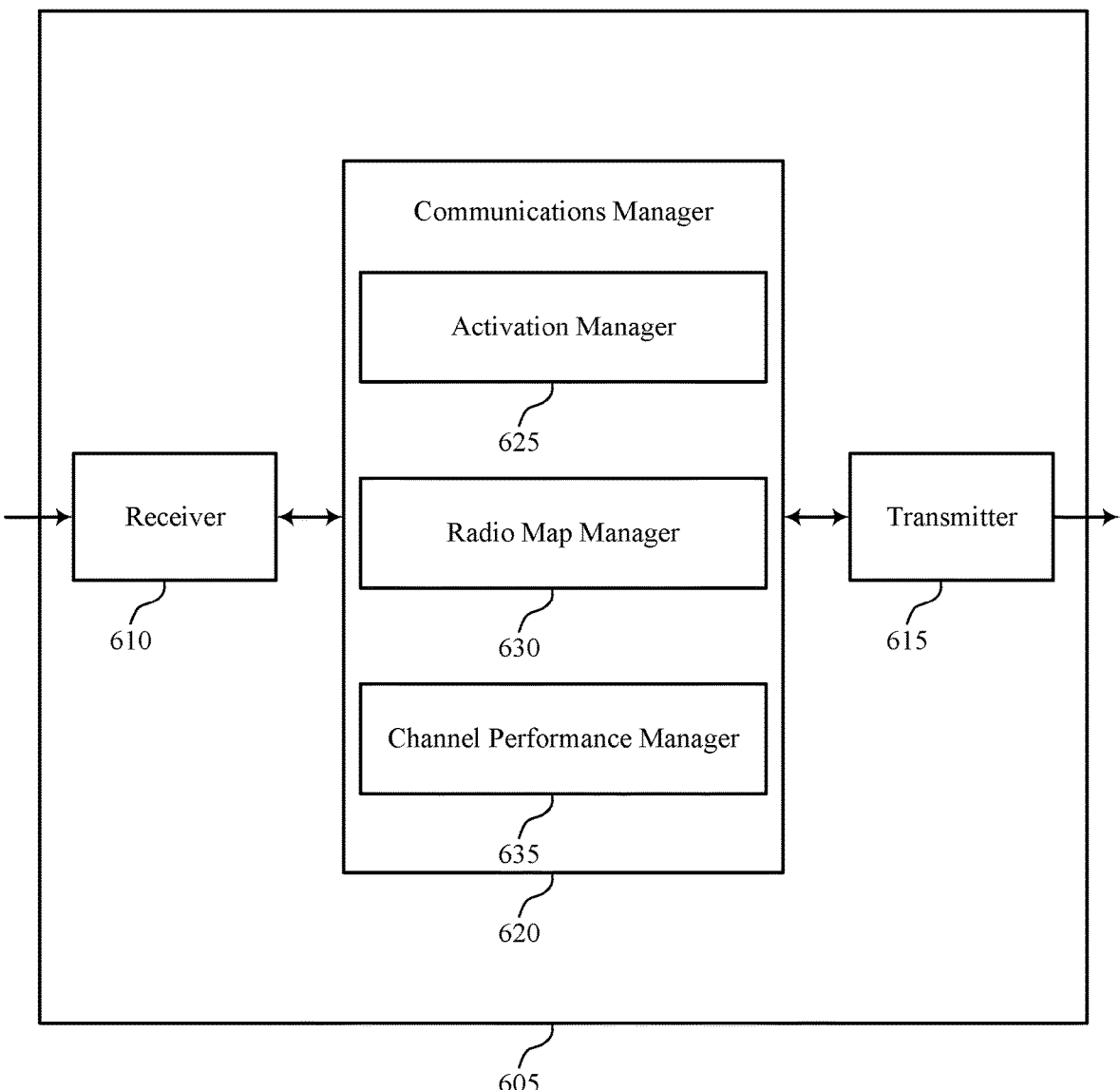

FIG. 6 illustrates a block diagram 600 of a device 605 that supports radio map-based uplink power control in accordance with one or more aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to radio map-based uplink power control). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to radio map-based uplink power control). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of radio map-based uplink power control as described herein. For example, the communications manager 620 may include an activation manager 625, a radio map manager 630, a channel performance manager 635, or any combination thereof. The communications manager 620 may be an example of aspects of a communications manager 520 as described herein. In some examples, the communications manager 620, or various components thereof, may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communication at a UE in accordance with examples as disclosed herein. The activation manager 625 may be configured as or otherwise support a means for receiving, from a network entity, an activation signal that transitions the UE from a first mode where the UE is capable of determining a channel quality using reference signals from the network entity to a second mode where the UE is capable of determining the channel quality using radio maps associated with the network entity, each radio map defines information associated with the channel quality for each area within a set of areas corresponding to a coverage area of the network entity. The radio map manager 630 may be configured as or otherwise support a means for receiving, based on the activation signal, an indication of a set of radio maps associated with the network entity. The channel performance manager 635 may be configured as or otherwise support a means for performing a channel performance procedure to determine the channel quality associated with the network entity using the set of radio maps and a geographic location of the UE, the geographic location of the UE being mapped within the set of radio maps associated with the network entity.

Figure 7:
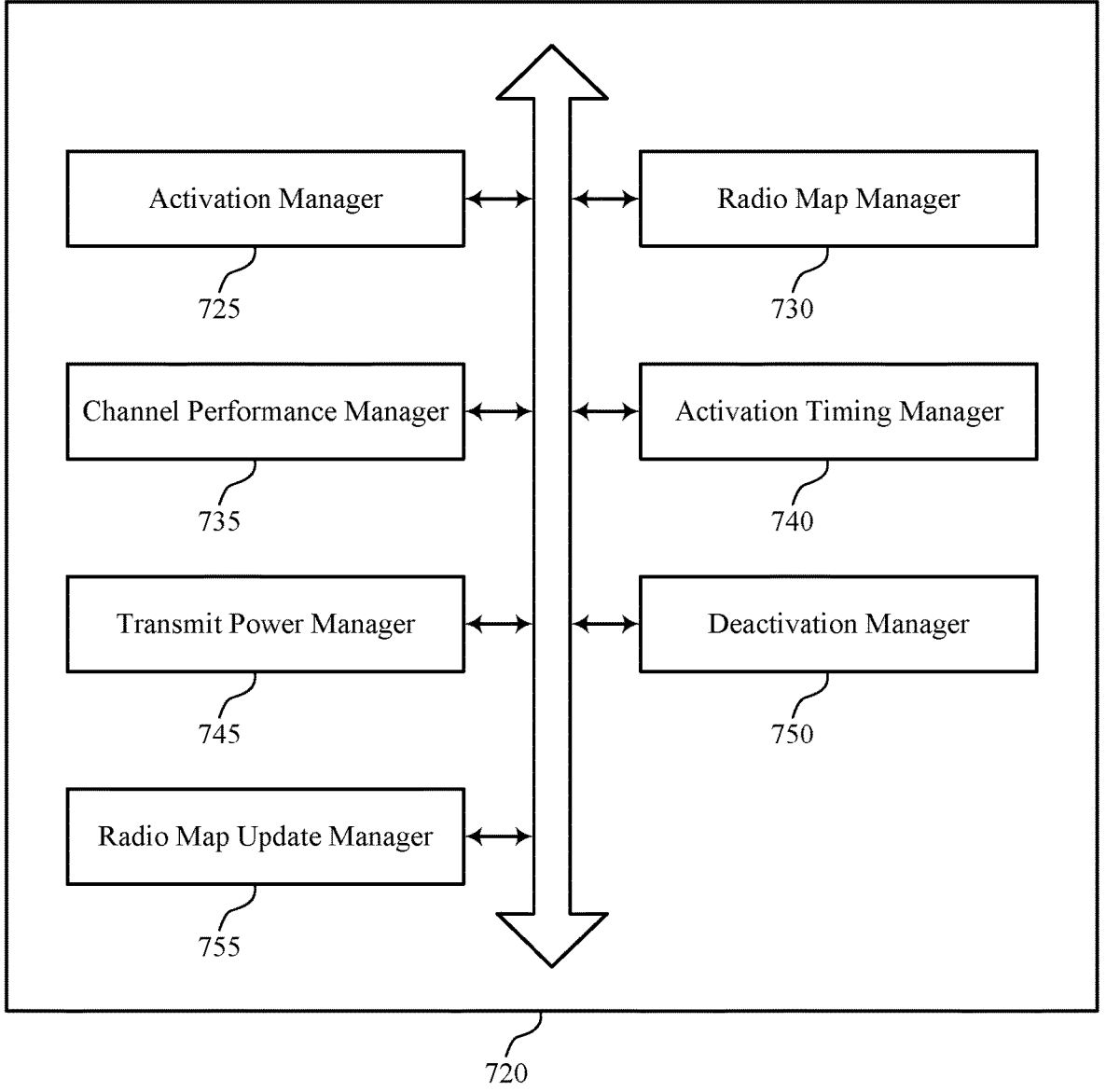
FIG. 7 illustrates a block diagram of a communications manager that supports radio map-based uplink power control in accordance with one or more aspects of the present disclosure.

FIG. 7 illustrates a block diagram 700 of a communications manager 720 that supports radio map-based uplink power control in accordance with one or more aspects of the present disclosure. The communications manager 720 may be an example of aspects of a communications manager 520, a communications manager 620, or both, as described herein. The communications manager 720, or various components thereof, may be an example of means for performing various aspects of radio map-based uplink power control as described herein. For example, the communications manager 720 may include an activation manager 725, a radio map manager 730, a channel performance manager 735, an activation timing manager 740, a transmit power manager 745, a deactivation manager 750, a radio map update manager 755, or any combination thereof. Each of these components may communicate, directly or indirectly, with one another (e.g., via one or more buses).

The communications manager 720 may support wireless communication at a UE in accordance with examples as disclosed herein. The activation manager 725 may be configured as or otherwise support a means for receiving, from a network entity, an activation signal that transitions the UE from a first mode where the UE is capable of determining a channel quality using reference signals from the network entity to a second mode where the UE is capable of determining the channel quality using radio maps associated with the network entity, each radio map defines information associated with the channel quality for each area within a set of areas corresponding to a coverage area of the network entity. The radio map manager 730 may be configured as or otherwise support a means for receiving, based on the activation signal, an indication of a set of radio maps associated with the network entity. The channel performance manager 735 may be configured as or otherwise support a means for performing a channel performance procedure to determine the channel quality associated with the network entity using the set of radio maps and a geographic location of the UE, the geographic location of the UE being mapped within the set of radio maps associated with the network entity.

In some examples, the activation timing manager 740 may be configured as or otherwise support a means for determining the channel quality according to the first mode after receiving the activation signal and prior to receiving the indication of the set of radio maps. In some examples, the activation timing manager 740 may be configured as or otherwise support a means for transitioning to the second mode to determine the channel quality using the set of radio maps after receiving the indication of the set of radio maps.

In some examples, the transmit power manager 745 may be configured as or otherwise support a means for selecting an uplink transmit power for communications with the network entity based on the channel quality determined using the set of radio maps.

In some examples, to support selecting the uplink transmit power, the transmit power manager 745 may be configured as or otherwise support a means for determining a predicted pathloss using the set of radio maps, where the channel quality is based on the predicted pathloss.

In some examples, to support selecting the uplink transmit power, the transmit power manager 745 may be configured as or otherwise support a means for measuring one or more reference signals from the network entity to determine a reference signal power. In some examples, to support selecting the uplink transmit power, the transmit power manager 745 may be configured as or otherwise support a means for determining a filtered reference signal received power (RSRP) using the set of radio maps. In some examples, to support selecting the uplink transmit power, the transmit power manager 745 may be configured as or otherwise support a means for determining a predicted pathloss using the reference signal power and the filtered RSRP, where the channel quality is based on the predicted pathloss.

In some examples, the deactivation manager 750 may be configured as or otherwise support a means for receiving a deactivation signal that transitions the UE from the second mode to the first mode, where the UE determines the channel quality by measuring the reference signals from the network entity in response to receiving the deactivation signal.

In some examples, the radio map update manager 755 may be configured as or otherwise support a means for receiving, from the network entity, a flag indicating that one or more radio maps in the set of radio maps associated with the network entity has been updated. In some examples, the radio map update manager 755 may be configured as or otherwise support a means for obtaining one or more updated radio maps from a radio map server in response to the flag. In some examples, the radio map update manager 755 may be configured as or otherwise support a means for transmitting an acknowledgement message to the network entity confirming receipt of the one or more updated radio maps.

In some examples, to support obtaining the one or more updated radio maps, the radio map update manager 755 may be configured as or otherwise support a means for transmitting a request to the radio map server requesting the one or more updated radio maps, the request including an identifier associated with the network entity. In some examples, to support obtaining the one or more updated radio maps, the radio map update manager 755 may be configured as or otherwise support a means for receiving the one or more updated radio maps from the radio map server in response to the request.

In some examples, the flag is received in a medium access control-control element (MAC-CE), the MAC-CE including an identifier associated with the network entity and the flag.

In some examples, the network entity is associated with a set of multiple sets of radio maps, each radio map in the set of multiple sets of radio maps is associated with an identifier of the network entity and a beam identifier associated with the network entity.

In some examples, the activation signal is received in an uplink power control information element (IE) of an RRC signal and the indication of the set of radio maps is received in a medium access control-control element (MAC-CE).

Figure 8:
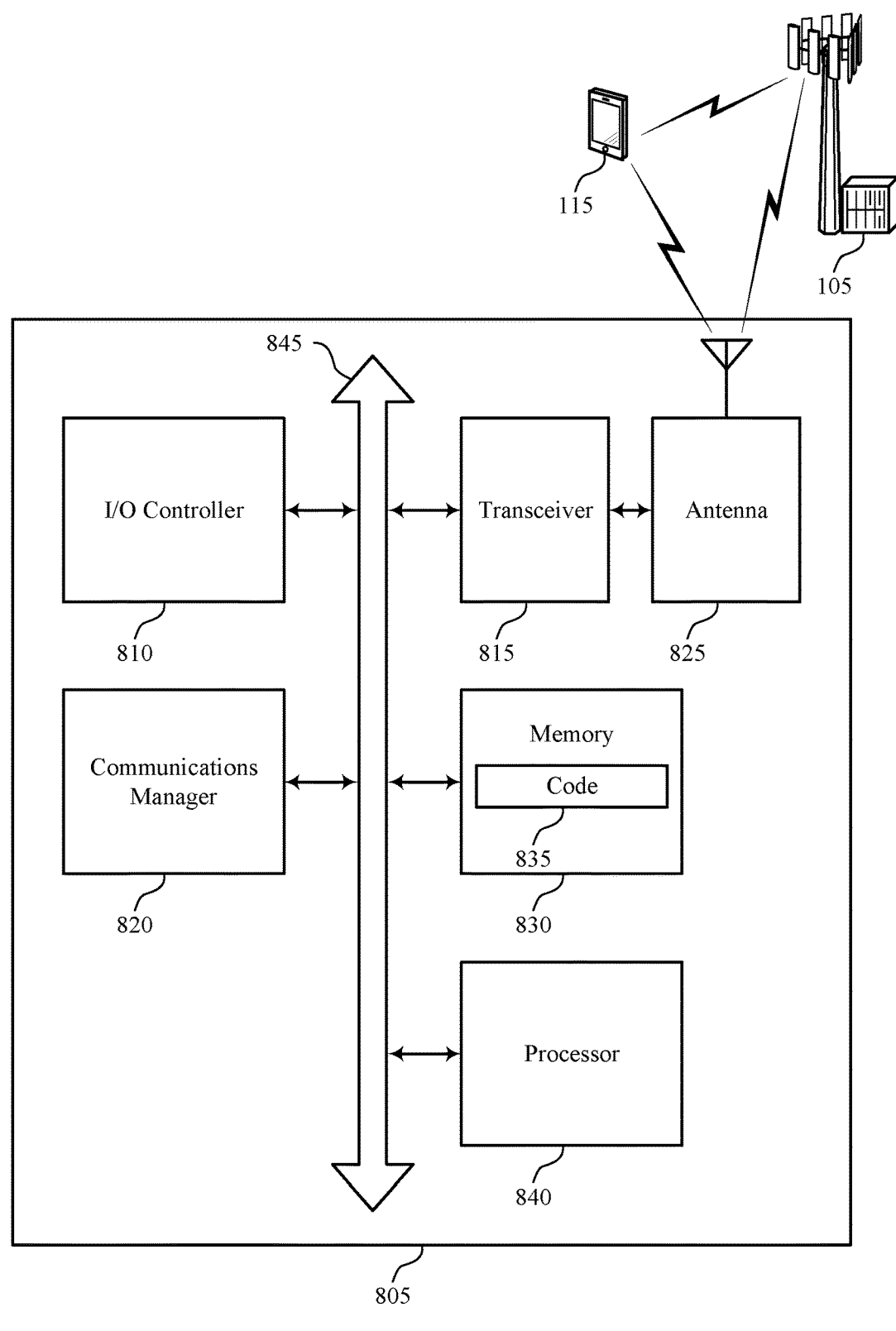
FIG. 8 illustrates a diagram of a system including a device that supports radio map-based uplink power control in accordance with one or more aspects of the present disclosure.

FIG. 8 illustrates a diagram of a system 800 including a device 805 that supports radio map-based uplink power control in accordance with one or more aspects of the present disclosure. The device 805 may be an example of or include the components of a device 505, a device 605, or a UE 115 as described herein. The device 805 may communicate (e.g., wirelessly) with one or more network entities 105, one or more UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting radio map-based uplink power control). For example, the device 805 or a component of the device 805 may include a processor 840 and memory 830 coupled with or to the processor 840, the processor 840 and memory 830 configured to perform various functions described herein.

The communications manager 820 may support wireless communication at a UE in accordance with examples as disclosed herein. For example, the communications manager 820 may be configured as or otherwise support a means for receiving, from a network entity, an activation signal that transitions the UE from a first mode where the UE is capable of determining a channel quality using reference signals from the network entity to a second mode where the UE is capable of determining the channel quality using radio maps associated with the network entity, each radio map defines information associated with the channel quality for each area within a set of areas corresponding to a coverage area of the network entity. The communications manager 820 may be configured as or otherwise support a means for receiving, based on the activation signal, an indication of a set of radio maps associated with the network entity. The communications manager 820 may be configured as or otherwise support a means for performing a channel performance procedure to determine the channel quality associated with the network entity using the set of radio maps and a geographic location of the UE, the geographic location of the UE being mapped within the set of radio maps associated with the network entity.

By including or configuring the communications manager 820 in accordance with examples as described herein, the device 805 may support techniques for improving channel estimation procedure using radio maps to determine an uplink transmit power of a UE.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of radio map-based uplink power control as described herein, or the processor 840 and the memory 830 may be otherwise configured to perform or support such operations.

Figure 9:
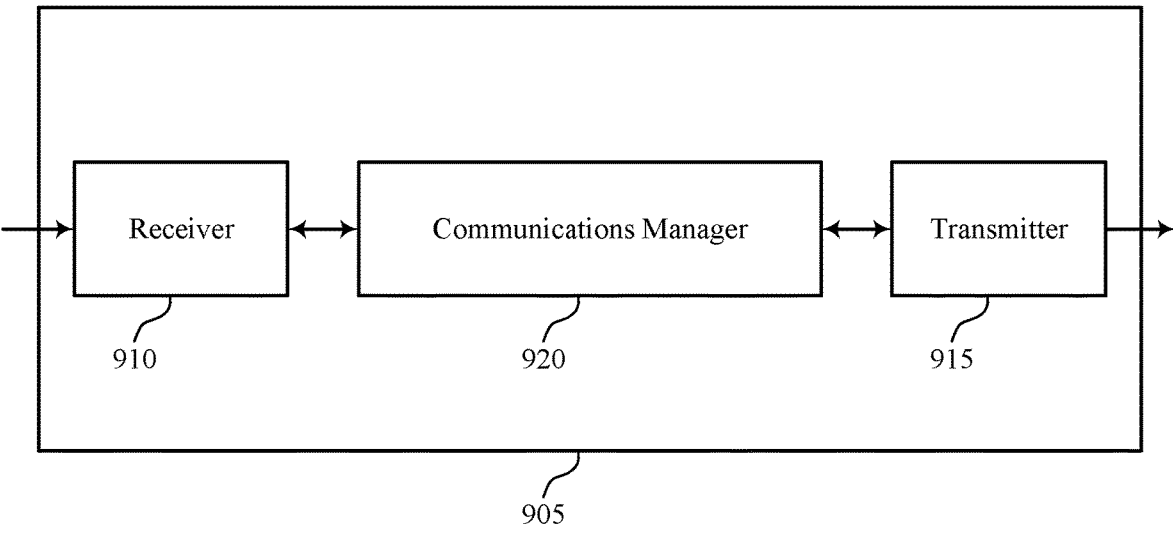
FIGS. 9 and 10 illustrate block diagrams of devices that support radio map-based uplink power control in accordance with one or more aspects of the present disclosure.

FIG. 9 illustrates a block diagram 900 of a device 905 that supports radio map-based uplink power control in accordance with one or more aspects of the present disclosure. The device 905 may be an example of aspects of a network entity 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 905. In some examples, the receiver 910 may support obtaining information by receiving signals via one or more antennas. Additionally, or alternatively, the receiver 910 may support obtaining information by receiving signals via one or more wired (e.g., electrical, fiber optic) interfaces, wireless interfaces, or any combination thereof.

The transmitter 915 may provide a means for outputting (e.g., transmitting, providing, conveying, sending) information generated by other components of the device 905. For example, the transmitter 915 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 915 may support outputting information by transmitting signals via one or more antennas. Additionally, or alternatively, the transmitter 915 may support outputting information by transmitting signals via one or more wired (e.g., electrical, fiber optic) interfaces, wireless interfaces, or any combination thereof. In some examples, the transmitter 915 and the receiver 910 may be co-located in a transceiver, which may include or be coupled with a modem.

The communications manager 920, the receiver 910, the transmitter 915, or various combinations thereof or various components thereof may be examples of means for performing various aspects of radio map-based uplink power control as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 920 may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communication at a network entity in accordance with examples as disclosed herein. For example, the communications manager 920 may be configured as or otherwise support a means for transmitting, to a UE, an activation signal that transitions the UE from a first mode where the UE is capable of determining a channel quality using reference signals from the network entity to a second mode where the UE is capable of determining the channel quality using radio maps associated with the network entity, each radio map defining information associated with the channel quality for each area within a set of areas corresponding to a coverage area of the network entity. The communications manager 920 may be configured as or otherwise support a means for transmitting, based on the activation signal, an indication of a set of radio maps associated with the network entity to the UE, where the UE determines the channel quality associated with the network entity using the set of radio maps and a geographic location of the UE, the geographic location of the UE being mapped within the set of radio maps associated with the network entity.

By including or configuring the communications manager 920 in accordance with examples as described herein, the device 905 (e.g., a processor controlling or otherwise coupled with the receiver 910, the transmitter 915, the communications manager 920, or a combination thereof) may support techniques for improving channel estimation procedure using radio maps to determine an uplink transmit power of a UE.

Figure 10:
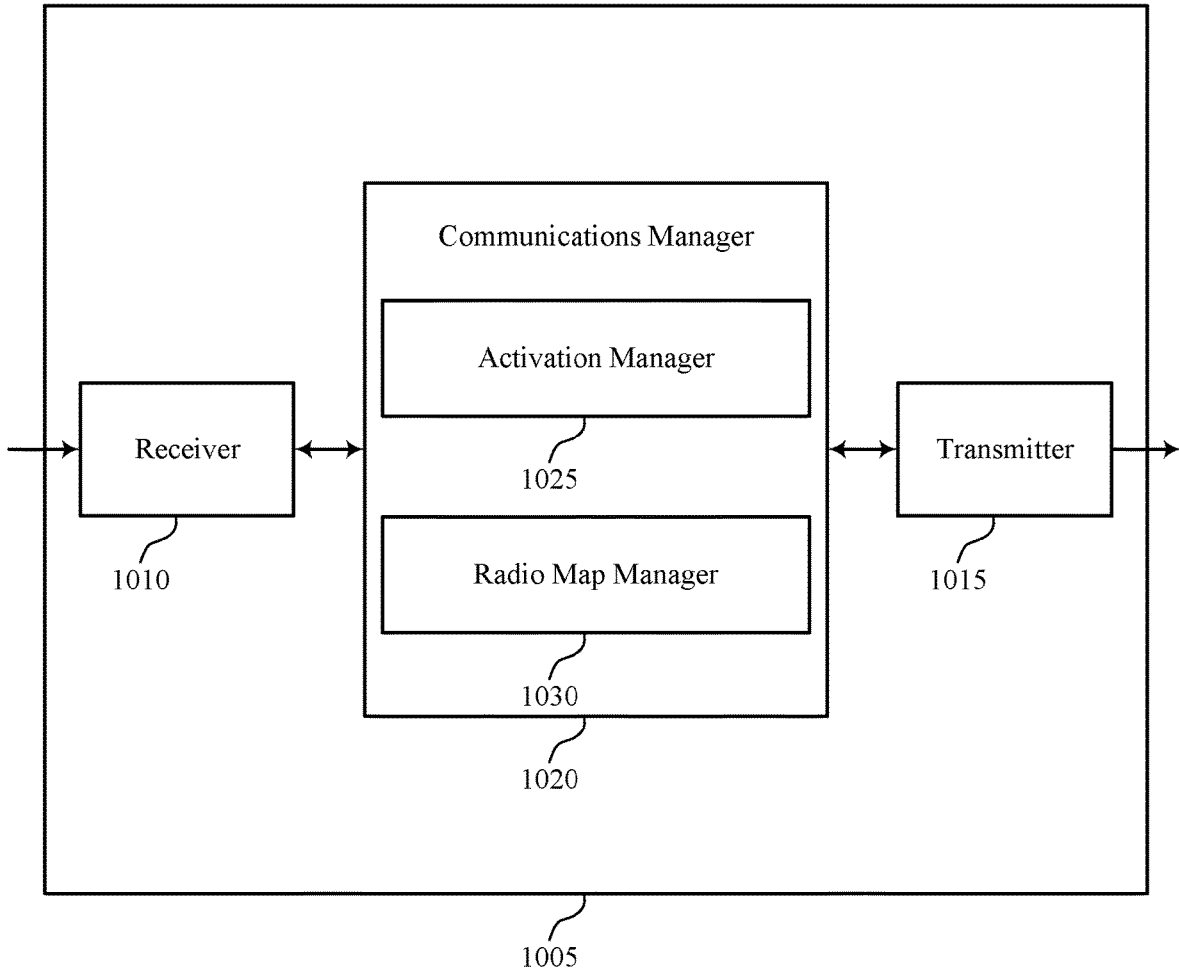

FIG. 10 illustrates a block diagram 1000 of a device 1005 that supports radio map-based uplink power control in accordance with one or more aspects of the present disclosure. The device 1005 may be an example of aspects of a device 905 or a network entity 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1005. In some examples, the receiver 1010 may support obtaining information by receiving signals via one or more antennas. Additionally, or alternatively, the receiver 1010 may support obtaining information by receiving signals via one or more wired (e.g., electrical, fiber optic) interfaces, wireless interfaces, or any combination thereof.

The transmitter 1015 may provide a means for outputting (e.g., transmitting, providing, conveying, sending) information generated by other components of the device 1005. For example, the transmitter 1015 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1015 may support outputting information by transmitting signals via one or more antennas. Additionally, or alternatively, the transmitter 1015 may support outputting information by transmitting signals via one or more wired (e.g., electrical, fiber optic) interfaces, wireless interfaces, or any combination thereof. In some examples, the transmitter 1015 and the receiver 1010 may be co-located in a transceiver, which may include or be coupled with a modem.

The device 1005, or various components thereof, may be an example of means for performing various aspects of radio map-based uplink power control as described herein. For example, the communications manager 1020 may include an activation manager 1025 a radio map manager 1030, or any combination thereof. The communications manager 1020 may be an example of aspects of a communications manager 920 as described herein. In some examples, the communications manager 1020, or various components thereof, may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communication at a network entity in accordance with examples as disclosed herein. The activation manager 1025 may be configured as or otherwise support a means for transmitting, to a UE, an activation signal that transitions the UE from a first mode where the UE is capable of determining a channel quality using reference signals from the network entity to a second mode where the UE is capable of determining the channel quality using radio maps associated with the network entity, each radio map defining information associated with the channel quality for each area within a set of areas corresponding to a coverage area of the network entity. The radio map manager 1030 may be configured as or otherwise support a means for transmitting, based on the activation signal, an indication of a set of radio maps associated with the network entity to the UE, where the UE determines the channel quality associated with the network entity using the set of radio maps and a geographic location of the UE, the geographic location of the UE being mapped within the set of radio maps associated with the network entity.

Figure 11:
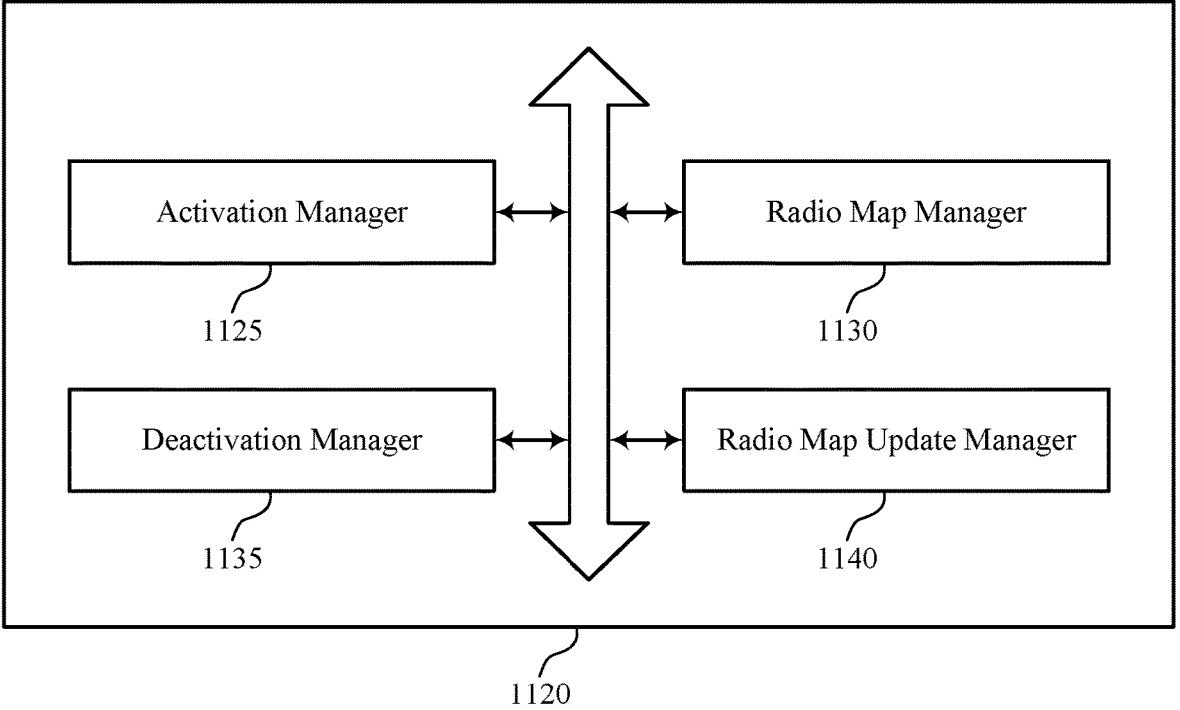
FIG. 11 illustrates a block diagram of a communications manager that supports radio map-based uplink power control in accordance with one or more aspects of the present disclosure.

FIG. 11 illustrates a block diagram 1100 of a communications manager 1120 that supports radio map-based uplink power control in accordance with one or more aspects of the present disclosure. The communications manager 1120 may be an example of aspects of a communications manager 920, a communications manager 1020, or both, as described herein. The communications manager 1120, or various components thereof, may be an example of means for performing various aspects of radio map-based uplink power control as described herein. For example, the communications manager 1120 may include an activation manager 1125, a radio map manager 1130, a deactivation manager 1135, a radio map update manager 1140, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1120 may support wireless communication at a network entity in accordance with examples as disclosed herein. The activation manager 1125 may be configured as or otherwise support a means for transmitting, to a UE, an activation signal that transitions the UE from a first mode where the UE is capable of determining a channel quality using reference signals from the network entity to a second mode where the UE is capable of determining the channel quality using radio maps associated with the network entity, each radio map defining information associated with the channel quality for each area within a set of areas corresponding to a coverage area of the network entity. The radio map manager 1130 may be configured as or otherwise support a means for transmitting, based on the activation signal, an indication of a set of radio maps associated with the network entity to the UE, where the UE determines the channel quality associated with the network entity using the set of radio maps and a geographic location of the UE, the geographic location of the UE being mapped within the set of radio maps associated with the network entity.

In some examples, the deactivation manager 1135 may be configured as or otherwise support a means for transmitting a deactivation signal to the UE that transitions the UE from the second mode to the first mode, where the UE determines the channel quality by measuring the reference signals from the network entity in response to receiving the deactivation signal.

In some examples, the radio map update manager 1140 may be configured as or otherwise support a means for receiving, from a radio map server, an indication that one or more radio maps in the set of radio maps associated with the network entity has been updated. In some examples, the radio map update manager 1140 may be configured as or otherwise support a means for transmitting a flag set to indicate that the one or more radio maps in the set of radio maps associated with the network entity has been updated. In some examples, the radio map update manager 1140 may be configured as or otherwise support a means for receiving an acknowledgement message from the UE confirming receipt of updated radio maps. In some examples, the radio map update manager 1140 may be configured as or otherwise support a means for resetting the flag based on the acknowledgement message.

In some examples, the flag is transmitted in a medium access control-control element (MAC-CE), the MAC-CE including an identifier associated with the network entity and the flag.

In some examples, the network entity is associated with a set of multiple sets of radio maps, each radio map in the set of multiple sets of radio maps is associated with an identifier of the network entity and a beam identifier associated with the network entity.

In some examples, the activation signal is transmitted in an uplink power control information element (IE) of an RRC signal and the indication of the set of radio maps is transmitted in a medium access control-control element (MAC-CE).

Figure 12:
FIG. 12 illustrates a diagram of a system including a device that supports radio map-based uplink power control in accordance with one or more aspects of the present disclosure.

FIG. 12 illustrates a diagram of a system 1200 including a device 1205 that supports radio map-based uplink power control in accordance with one or more aspects of the present disclosure. The device 1205 may be an example of or include the components of a device 905, a device 1005, or a network entity 105 as described herein. The device 1205 may communicate with one or more network entities 105, one or more UEs 115, or any combination thereof, which may include communications over one or more wired interfaces, over one or more wireless interfaces, or any combination thereof. The device 1205 may include components that support outputting and obtaining communications, such as a communications manager 1220, a transceiver 1210, an antenna 1215, a memory 1225, code 1230, and a processor 1235. These components may be in electronic communication or otherwise coupled (e.g., operatively, communicatively, functionally, electronically, electrically) via one or more buses (e.g., a bus 1240).

The transceiver 1210 may support bi-directional communications via wired links, wireless links, or both as described herein. In some examples, the transceiver 1210 may include a wired transceiver and may communicate bi-directionally with another wired transceiver. Additionally, or alternatively, in some examples, the transceiver 1210 may include a wireless transceiver and may communicate bi-directionally with another wireless transceiver. In some examples, the device 1205 may include one or more antennas 1215, which may be capable of transmitting or receiving wireless transmissions (e.g., concurrently). The transceiver 1210 may also include a modem to modulate signals, to provide the modulated signals for transmission (e.g., by one or more antennas 1215, by a wired transmitter), to receive modulated signals (e.g., from one or more antennas 1215, from a wired receiver), and to demodulate signals. In some implementations, the transceiver 1210 may include one or more interfaces, such as one or more interfaces coupled with the one or more antennas 1215 that are configured to support various receiving or obtaining operations, or one or more interfaces coupled with the one or more antennas 1215 that are configured to support various transmitting or outputting operations, or a combination thereof. In some implementations, the transceiver 1210 may include or be configured for coupling with one or more processors or memory components that are operable to perform or support operations based on received or obtained information or signals, or to generate information or other signals for transmission or other outputting, or any combination thereof. In some implementations, the transceiver 1210, or the transceiver 1210 and the one or more antennas 1215, or the transceiver 1210 and the one or more antennas 1215 and one or more processors or memory components (for example, the processor 1235, or the memory 1225, or both), may be included in a chip or chip assembly that is installed in the device 1205. In some examples, the transceiver may be operable to support communications via one or more communications links (e.g., a communication link 125, a backhaul communication link 120, a midhaul communication link 162, a fronthaul communication link 168).

The memory 1225 may include RAM and ROM. The memory 1225 may store computer-readable, computer-executable code 1230 including instructions that, when executed by the processor 1235, cause the device 1205 to perform various functions described herein. The code 1230 may be stored in a non-transitory computer-readable medium such as system memory or another type of memory. In some cases, the code 1230 may not be directly executable by the processor 1235 but may cause a computer (e.g., when compiled and executed) to perform functions described herein. In some cases, the memory 1225 may contain, among other things, a BIOS which may control basic hardware or software operation such as the interaction with peripheral components or devices.

The processor 1235 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1235 may be configured to operate a memory array using a memory controller. In some other cases, a memory controller may be integrated into the processor 1235. The processor 1235 may be configured to execute computer-readable instructions stored in a memory (e.g., the memory 1225) to cause the device 1205 to perform various functions (e.g., functions or tasks supporting radio map-based uplink power control). For example, the device 1205 or a component of the device 1205 may include a processor 1235 and memory 1225 coupled with the processor 1235, the processor 1235 and memory 1225 configured to perform various functions described herein. The processor 1235 may be an example of a cloud-computing platform (e.g., one or more physical nodes and supporting software such as operating systems, virtual machines, or container instances) that may host the functions (e.g., by executing code 1230) to perform the functions of the device 1205. The processor 1235 may be any one or more suitable processors capable of executing scripts or instructions of one or more software programs stored in the device 1205 (such as within the memory 1225). In some implementations, the processor 1235 may be a component of a processing system. A processing system may generally refer to a system or series of machines or components that receives inputs and processes the inputs to produce a set of outputs (which may be passed to other systems or components of, for example, the device 1205). For example, a processing system of the device 1205 may refer to a system including the various other components or subcomponents of the device 1205, such as the processor 1235, or the transceiver 1210, or the communications manager 1220, or other components or combinations of components of the device 1205. The processing system of the device 1205 may interface with other components of the device 1205, and may process information received from other components (such as inputs or signals) or output information to other components. For example, a chip or modem of the device 1205 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 1205 may transmit information output from the chip or modem. Additionally, or alternatively, in some implementations, the one or more interfaces may refer to an interface between the processing system of the chip or modem and a receiver, such that the device 1205 may obtain information or signal inputs, and the information may be passed to the processing system. A person having ordinary skill in the art will readily recognize that a first interface also may obtain information or signal inputs, and a second interface also may output information or signal outputs.

In some examples, a bus 1240 may support communications of (e.g., within) a protocol layer of a protocol stack. In some examples, a bus 1240 may support communications associated with a logical channel of a protocol stack (e.g., between protocol layers of a protocol stack), which may include communications performed within a component of the device 1205, or between different components of the device 1205 that may be co-located or located in different locations (e.g., where the device 1205 may refer to a system in which one or more of the communications manager 1220, the transceiver 1210, the memory 1225, the code 1230, and the processor 1235 may be located in one of the different components or divided between different components).

In some examples, the communications manager 1220 may manage aspects of communications with a core network 130 (e.g., via one or more wired or wireless backhaul links). For example, the communications manager 1220 may manage the transfer of data communications for client devices, such as one or more UEs 115. In some examples, the communications manager 1220 may manage communications with other network entities 105, and may include a controller or scheduler for controlling communications with UEs 115 in cooperation with other network entities 105. In some examples, the communications manager 1220 may support an X2 interface within an LTE/LTE-A wireless communications network technology to provide communication between network entities 105.

The communications manager 1220 may support wireless communication at a network entity in accordance with examples as disclosed herein. For example, the communications manager 1220 may be configured as or otherwise support a means for transmitting, to a UE, an activation signal that transitions the UE from a first mode where the UE is capable of determining a channel quality using reference signals from the network entity to a second mode where the UE is capable of determining the channel quality using radio maps associated with the network entity, each radio map defining information associated with the channel quality for each area within a set of areas corresponding to a coverage area of the network entity. The communications manager 1220 may be configured as or otherwise support a means for transmitting, based on the activation signal, an indication of a set of radio maps associated with the network entity to the UE, where the UE determines the channel quality associated with the network entity using the set of radio maps and a geographic location of the UE, the geographic location of the UE being mapped within the set of radio maps associated with the network entity.

By including or configuring the communications manager 1220 in accordance with examples as described herein, the device 1205 may support techniques for improving channel estimation procedure using radio maps to determine an uplink transmit power of a UE.

In some examples, the communications manager 1220 may be configured to perform various operations (e.g., receiving, obtaining, monitoring, outputting, transmitting) using or otherwise in cooperation with the transceiver 1210, the one or more antennas 1215 (e.g., where applicable), or any combination thereof. Although the communications manager 1220 is illustrated as a separate component, in some examples, one or more functions described with reference to the communications manager 1220 may be supported by or performed by the transceiver 1210, the processor 1235, the memory 1225, the code 1230, or any combination thereof. For example, the code 1230 may include instructions executable by the processor 1235 to cause the device 1205 to perform various aspects of radio map-based uplink power control as described herein, or the processor 1235 and the memory 1225 may be otherwise configured to perform or support such operations.

FIG. 13 illustrates a flowchart showing a method 1300 that supports radio map-based uplink power control in accordance with one or more aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1305, the method may include receiving, from a network entity, an activation signal that transitions the UE from a first mode where the UE is capable of determining a channel quality using reference signals from the network entity to a second mode where the UE is capable of determining the channel quality using radio maps associated with the network entity, each radio map defines information associated with the channel quality for each area within a set of areas corresponding to a coverage area of the network entity. The operations of 1305 may be performed in accordance with examples as disclosed herein. In some examples, aspects of the operations of 1305 may be performed by an activation manager 725 as described with reference to FIG. 7.

At 1310, the method may include receiving, based on the activation signal, an indication of a set of radio maps associated with the network entity. The operations of 1310 may be performed in accordance with examples as disclosed herein. In some examples, aspects of the operations of 1310 may be performed by a radio map manager 730 as described with reference to FIG. 7.

At 1315, the method may include performing a channel performance procedure to determine the channel quality associated with the network entity using the set of radio maps and a geographic location of the UE, the geographic location of the UE being mapped within the set of radio maps associated with the network entity. The operations of 1315 may be performed in accordance with examples as disclosed herein. In some examples, aspects of the operations of 1315 may be performed by a channel performance manager 735 as described with reference to FIG. 7.

FIG. 14 illustrates a flowchart showing a method 1400 that supports radio map-based uplink power control in accordance with one or more aspects of the present disclosure. The operations of the method 1400 may be implemented by a UE or its components as described herein. For example, the operations of the method 1400 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1405, the method may include receiving, from a network entity, an activation signal that transitions the UE from a first mode where the UE is capable of determining a channel quality using reference signals from the network entity to a second mode where the UE is capable of determining the channel quality using radio maps associated with the network entity, each radio map defines information associated with the channel quality for each area within a set of areas corresponding to a coverage area of the network entity. The operations of 1405 may be performed in accordance with examples as disclosed herein. In some examples, aspects of the operations of 1405 may be performed by an activation manager 725 as described with reference to FIG. 7.

At 1410, the method may include receiving, based on the activation signal, an indication of a set of radio maps associated with the network entity. The operations of 1410 may be performed in accordance with examples as disclosed herein. In some examples, aspects of the operations of 1410 may be performed by a radio map manager 730 as described with reference to FIG. 7.

At 1415, the method may include performing a channel performance procedure to determine the channel quality associated with the network entity using the set of radio maps and a geographic location of the UE, the geographic location of the UE being mapped within the set of radio maps associated with the network entity. The operations of 1415 may be performed in accordance with examples as disclosed herein. In some examples, aspects of the operations of 1415 may be performed by a channel performance manager 735 as described with reference to FIG. 7.

At 1420, the method may include determining the channel quality according to the first mode after receiving the activation signal and prior to receiving the indication of the set of radio maps. The operations of 1420 may be performed in accordance with examples as disclosed herein. In some examples, aspects of the operations of 1420 may be performed by an activation timing manager 740 as described with reference to FIG. 7.

At 1425, the method may include transitioning to the second mode to determine the channel quality using the set of radio maps after receiving the indication of the set of radio maps. The operations of 1425 may be performed in accordance with examples as disclosed herein. In some examples, aspects of the operations of 1425 may be performed by an activation timing manager 740 as described with reference to FIG. 7.

FIG. 15 illustrates a flowchart showing a method 1500 that supports radio map-based uplink power control in accordance with one or more aspects of the present disclosure. The operations of the method 1500 may be implemented by a UE or its components as described herein. For example, the operations of the method 1500 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1505, the method may include receiving, from a network entity, an activation signal that transitions the UE from a first mode where the UE is capable of determining a channel quality using reference signals from the network entity to a second mode where the UE is capable of determining the channel quality using radio maps associated with the network entity, each radio map defines information associated with the channel quality for each area within a set of areas corresponding to a coverage area of the network entity. The operations of 1505 may be performed in accordance with examples as disclosed herein. In some examples, aspects of the operations of 1505 may be performed by an activation manager 725 as described with reference to FIG. 7.

At 1510, the method may include receiving, based on the activation signal, an indication of a set of radio maps associated with the network entity. The operations of 1510 may be performed in accordance with examples as disclosed herein. In some examples, aspects of the operations of 1510 may be performed by a radio map manager 730 as described with reference to FIG. 7.

At 1515, the method may include performing a channel performance procedure to determine the channel quality associated with the network entity using the set of radio maps and a geographic location of the UE, the geographic location of the UE being mapped within the set of radio maps associated with the network entity. The operations of 1515 may be performed in accordance with examples as disclosed herein. In some examples, aspects of the operations of 1515 may be performed by a channel performance manager 735 as described with reference to FIG. 7.

At 1520, the method may include selecting an uplink transmit power for communications with the network entity based on the channel quality determined using the set of radio maps. The operations of 1520 may be performed in accordance with examples as disclosed herein. In some examples, aspects of the operations of 1520 may be performed by a transmit power manager 745 as described with reference to FIG. 7.

FIG. 16 illustrates a flowchart showing a method 1600 that supports radio map-based uplink power control in accordance with one or more aspects of the present disclosure. The operations of the method 1600 may be implemented by a network entity or its components as described herein. For example, the operations of the method 1600 may be performed by a network entity as described with reference to FIGS. 1 through 4 and 9 through 12. In some examples, a network entity may execute a set of instructions to control the functional elements of the network entity to perform the described functions. Additionally, or alternatively, the network entity may perform aspects of the described functions using special-purpose hardware.

At 1605, the method may include transmitting, to a UE, an activation signal that transitions the UE from a first mode where the UE is capable of determining a channel quality using reference signals from the network entity to a second mode where the UE is capable of determining the channel quality using radio maps associated with the network entity, each radio map defining information associated with the channel quality for each area within a set of areas corresponding to a coverage area of the network entity. The operations of 1605 may be performed in accordance with examples as disclosed herein. In some examples, aspects of the operations of 1605 may be performed by an activation manager 1125 as described with reference to FIG. 11.

At 1610, the method may include transmitting, based on the activation signal, an indication of a set of radio maps associated with the network entity to the UE, where the UE determines the channel quality associated with the network entity using the set of radio maps and a geographic location of the UE, the geographic location of the UE being mapped within the set of radio maps associated with the network entity. The operations of 1610 may be performed in accordance with examples as disclosed herein. In some examples, aspects of the operations of 1610 may be performed by a radio map manager 1130 as described with reference to FIG. 11.

FIG. 17 illustrates a flowchart showing a method 1700 that supports radio map-based uplink power control in accordance with one or more aspects of the present disclosure. The operations of the method 1700 may be implemented by a network entity or its components as described herein. For example, the operations of the method 1700 may be performed by a network entity as described with reference to FIGS. 1 through 4 and 9 through 12. In some examples, a network entity may execute a set of instructions to control the functional elements of the network entity to perform the described functions. Additionally, or alternatively, the network entity may perform aspects of the described functions using special-purpose hardware.

At 1705, the method may include transmitting, to a UE, an activation signal that transitions the UE from a first mode where the UE is capable of determining a channel quality using reference signals from the network entity to a second mode where the UE is capable of determining the channel quality using radio maps associated with the network entity, each radio map defining information associated with the channel quality for each area within a set of areas corresponding to a coverage area of the network entity. The operations of 1705 may be performed in accordance with examples as disclosed herein. In some examples, aspects of the operations of 1705 may be performed by an activation manager 1125 as described with reference to FIG. 11.

At 1710, the method may include transmitting, based on the activation signal, an indication of a set of radio maps associated with the network entity to the UE, where the UE determines the channel quality associated with the network entity using the set of radio maps and a geographic location of the UE, the geographic location of the UE being mapped within the set of radio maps associated with the network entity. The operations of 1710 may be performed in accordance with examples as disclosed herein. In some examples, aspects of the operations of 1710 may be performed by a radio map manager 1130 as described with reference to FIG. 11.

At 1715, the method may include transmitting a deactivation signal to the UE that transitions the UE from the second mode to the first mode, where the UE determines the channel quality by measuring the reference signals from the network entity in response to receiving the deactivation signal. The operations of 1715 may be performed in accordance with examples as disclosed herein. In some examples, aspects of the operations of 1715 may be performed by a deactivation manager 1135 as described with reference to FIG. 11.

The following provides an overview of aspects of the present disclosure:

Aspect 1: A method for wireless communication at a UE, comprising: receiving, from a network entity, an activation signal that transitions the UE from a first mode where the UE is capable of determining a channel quality using reference signals from the network entity to a second mode where the UE is capable of determining the channel quality using radio maps associated with the network entity, each radio map defines information associated with the channel quality for each area within a set of areas corresponding to a coverage area of the network entity; receiving, based at least in part on the activation signal, an indication of a set of radio maps associated with the network entity; and performing a channel performance procedure to determine the channel quality associated with the network entity using the set of radio maps and a geographic location of the UE, the geographic location of the UE being mapped within the set of radio maps associated with the network entity.

Aspect 2: The method of aspect 1, further comprising: determining the channel quality according to the first mode after receiving the activation signal and prior to receiving the indication of the set of radio maps; and transitioning to the second mode to determine the channel quality using the set of radio maps after receiving the indication of the set of radio maps.

Aspect 3: The method of any of aspects 1 through 2, further comprising: selecting an uplink transmit power for communications with the network entity based at least in part on the channel quality determined using the set of radio maps.

Aspect 4: The method of aspect 3, wherein selecting the uplink transmit power comprises: determining a predicted pathloss using the set of radio maps, wherein the channel quality is based at least in part on the predicted pathloss.

Aspect 5: The method of any of aspects 3 through 4, wherein selecting the uplink transmit power comprises: measuring one or more reference signals from the network entity to determine a reference signal power; determining a filtered reference signal received power (RSRP) using the set of radio maps; and determining a predicted pathloss using the reference signal power and the filtered RSRP, wherein the channel quality is based at least in part on the predicted pathloss.

Aspect 6: The method of any of aspects 1 through 5, further comprising: receiving a deactivation signal that transitions the UE from the second mode to the first mode, where the UE determines the channel quality by measuring the reference signals from the network entity in response to receiving the deactivation signal.

Aspect 7: The method of any of aspects 1 through 6, further comprising: receiving, from the network entity, a flag indicating that one or more radio maps in the set of radio maps associated with the network entity has been updated; obtaining one or more updated radio maps from a radio map server in response to the flag; and transmitting an acknowledgement message to the network entity confirming receipt of the one or more updated radio maps.

Aspect 8: The method of aspect 7, wherein obtaining the one or more updated radio maps comprises: transmitting a request to the radio map server requesting the one or more updated radio maps, the request comprising an identifier associated with the network entity; and receiving the one or more updated radio maps from the radio map server in response to the request.

Aspect 9: The method of any of aspects 7 through 8, wherein the flag is received in a MAC-CE, the MAC-CE comprising an identifier associated with the network entity and the flag.

Aspect 10: The method of any of aspects 1 through 9, wherein the network entity is associated with a plurality of sets of radio maps, each radio map in the plurality of sets of radio maps is associated with an identifier of the network entity and a beam identifier associated with the network entity.

Aspect 11: The method of any of aspects 1 through 10, wherein the activation signal is received in an uplink power control IE of an RRC signal and the indication of the set of radio maps is received in a MAC-CE.

Aspect 12: A method for wireless communication at a network entity, comprising: transmitting, to a UE, an activation signal that transitions the UE from a first mode where the UE is capable of determining a channel quality using reference signals from the network entity to a second mode where the UE is capable of determining the channel quality using radio maps associated with the network entity, each radio map defining information associated with the channel quality for each area within a set of areas corresponding to a coverage area of the network entity; and transmitting, based at least in part on the activation signal, an indication of a set of radio maps associated with the network entity to the UE, wherein the UE determines the channel quality associated with the network entity using the set of radio maps and a geographic location of the UE, the geographic location of the UE being mapped within the set of radio maps associated with the network entity.

Aspect 13: The method of aspect 12, further comprising: transmitting a deactivation signal to the UE that transitions the UE from the second mode to the first mode, where the UE determines the channel quality by measuring the reference signals from the network entity in response to receiving the deactivation signal.

Aspect 14: The method of any of aspects 12 through 13, further comprising: receiving, from a radio map server, an indication that one or more radio maps in the set of radio maps associated with the network entity has been updated; transmitting a flag set to indicate that the one or more radio maps in the set of radio maps associated with the network entity has been updated; receiving an acknowledgement message from the UE confirming receipt of updated radio maps; and resetting the flag based at least in part on the acknowledgement message.

Aspect 15: The method of aspect 14, wherein the flag is transmitted in a MAC-CE, the MAC-CE comprising an identifier associated with the network entity and the flag.

Aspect 16: The method of any of aspects 12 through 15, wherein the network entity is associated with a plurality of sets of radio maps, each radio map in the plurality of sets of radio maps is associated with an identifier of the network entity and a beam identifier associated with the network entity.

Aspect 17: The method of any of aspects 12 through 16, wherein the activation signal is transmitted in an uplink power control IE of an RRC signal and the indication of the set of radio maps is transmitted in a MAC-CE.

Aspect 18: An apparatus for wireless communication at a UE, comprising a processor; memory coupled with the processor; and instructions stored in the memory and executable by the processor to cause the apparatus to perform a method of any of aspects 1 through 11.

Aspect 19: An apparatus for wireless communication at a UE, comprising at least one means for performing a method of any of aspects 1 through 11.

Aspect 20: A non-transitory computer-readable medium storing code for wireless communication at a UE, the code comprising instructions executable by a processor to perform a method of any of aspects 1 through 11.

Aspect 21: An apparatus for wireless communication at a network entity, comprising a processor; memory coupled with the processor; and instructions stored in the memory and executable by the processor to cause the apparatus to perform a method of any of aspects 12 through 17.

Aspect 22: An apparatus for wireless communication at a network entity, comprising at least one means for performing a method of any of aspects 12 through 17.

Aspect 23: A non-transitory computer-readable medium storing code for wireless communication at a network entity, the code comprising instructions executable by a processor to perform a method of any of aspects 12 through 17.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" may include calculating, computing, processing, deriving, investigating, looking up (such as via looking up in a table, a database or another data structure), ascertaining and the like. Also, "determining" may include receiving (e.g., receiving information), accessing (e.g., accessing data stored in memory) and the like. Also, "determining" may include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communication at a user equipment (UE), comprising:

a processor;

memory coupled with the processor; and instructions stored in the memory and executable by the processor to cause the apparatus to:

receive, from a network entity, an activation signal that transitions the UE from a first mode where the UE determines a channel quality using reference signals from the network entity to a second mode where the UE determines the channel quality using radio maps associated with the network entity, each radio map defines information associated with the channel quality for each area within a set of areas corresponding to a coverage area of the network entity;

receive, based at least in part on the activation signal, an indication of a set of radio maps associated with the network entity;

determine the channel quality according to the first mode after receiving the activation signal and prior to receiving the indication of the set of radio maps; and transition to the second mode to determine the channel quality using the set of radio maps after receiving the indication of the set of radio maps; and perform a channel performance procedure to determine the channel quality associated with the network entity using the set of radio maps and a geographic location of the UE, the geographic location of the UE being mapped within the set of radio maps associated with the network entity.

2. The apparatus of claim 1, wherein the instructions are further executable by the processor to cause the apparatus to:

select an uplink transmit power for communications with the network entity based at least in part on the channel quality determined using the set of radio maps.

3. The apparatus of claim 2, wherein the instructions to select the uplink transmit power are executable by the processor to cause the apparatus to:

determine a predicted pathloss using the set of radio maps, wherein the channel quality is based at least in part on the predicted pathloss.

4. The apparatus of claim 2, wherein the instructions to select the uplink transmit power are executable by the processor to cause the apparatus to:

measure one or more reference signals from the network entity to determine a reference signal power;

determine a filtered reference signal received power (RSRP) using the set of radio maps; and determine a predicted pathloss using the reference signal power and the filtered RSRP, wherein the channel quality is based at least in part on the predicted pathloss.

5. The apparatus of claim 1, wherein the instructions are further executable by the processor to cause the apparatus to:

receive a deactivation signal that transitions the UE from the second mode to the first mode, where the UE determines the channel quality by measuring the reference signals from the network entity in response to receiving the deactivation signal.

6. The apparatus of claim 1, wherein the instructions are further executable by the processor to cause the apparatus to:

receive, from the network entity, a flag indicating that one or more radio maps in the set of radio maps associated with the network entity has been updated;

obtain one or more updated radio maps from a radio map server in response to the flag; and transmit an acknowledgement message to the network entity confirming receipt of the one or more updated radio maps.

7. The apparatus of claim 6, wherein the instructions to obtain the one or more updated radio maps are executable by the processor to cause the apparatus to:

transmit a request to the radio map server requesting the one or more updated radio maps, the request comprising an identifier associated with the network entity; and receive the one or more updated radio maps from the radio map server in response to the request.

8. The apparatus of claim 6, wherein the flag is received in a medium access control-control element (MAC-CE), the MAC-CE comprising an identifier associated with the network entity and the flag.

9. The apparatus of claim 1, wherein the network entity is associated with a plurality of sets of radio maps, each radio map in the plurality of sets of radio maps is associated with an identifier of the network entity and a beam identifier associated with the network entity.

10. The apparatus of claim 1, wherein the activation signal is received in an uplink power control information element (IE) of a radio resource control (RRC) signal and the indication of the set of radio maps is received in a medium access control-control element (MAC-CE).

11. An apparatus for wireless communication at a network entity, comprising:

a processor;

memory coupled with the processor; and instructions stored in the memory and executable by the processor to cause the apparatus to:

transmit, to a user equipment (UE), an activation signal that transitions the UE from a first mode where the UE determines a channel quality using reference signals from the network entity to a second mode where the UE determines the channel quality using radio maps associated with the network entity, each radio map defining information associated with the channel quality for each area within a set of areas corresponding to a coverage area of the network entity;

transmit a deactivation signal to the UE that transitions the UE from the second mode to the first mode, where the UE determines the channel quality by measuring the reference signals from the network entity in response to receiving the deactivation signal; and transmit, based at least in part on the activation signal, an indication of a set of radio maps associated with the network entity to the UE, wherein the UE determines the channel quality associated with the network entity using the set of radio maps and a geographic location of the UE, the geographic location of the UE being mapped within the set of radio maps associated with the network entity.

12. The apparatus of claim 11, wherein the instructions are further executable by the processor to cause the apparatus to:

receive, from a radio map server, an indication that one or more radio maps in the set of radio maps associated with the network entity has been updated;

transmit a flag set to indicate that the one or more radio maps in the set of radio maps associated with the network entity has been updated;

receive an acknowledgement message from the UE confirming receipt of updated radio maps; and reset the flag based at least in part on the acknowledgement message.

13. The apparatus of claim 12, wherein the flag is transmitted in a medium access control-control element (MAC-CE), the MAC-CE comprising an identifier associated with the network entity and the flag.

14. The apparatus of claim 11, wherein the network entity is associated with a plurality of sets of radio maps, each radio map in the plurality of sets of radio maps is associated with an identifier of the network entity and a beam identifier associated with the network entity.

15. The apparatus of claim 11, wherein the activation signal is transmitted in an uplink power control information element (IE) of a radio resource control (RRC) signal and the indication of the set of radio maps is transmitted in a medium access control-control element (MAC-CE).

16. A method for wireless communication at a user equipment (UE), comprising:

receiving, from a network entity, an activation signal that transitions the UE from a first mode where the UE determines a channel quality using reference signals from the network entity to a second mode where the UE determines the channel quality using radio maps associated with the network entity, each radio map defines information associated with the channel quality for each area within a set of areas corresponding to a coverage area of the network entity;

receiving, based at least in part on the activation signal, an indication of a set of radio maps associated with the network entity;

determining the channel quality according to the first mode after receiving the activation signal and prior to receiving the indication of the set of radio maps; and transitioning to the second mode to determine the channel quality using the set of radio maps after receiving the indication of the set of radio maps; and performing a channel performance procedure to determine the channel quality associated with the network entity using the set of radio maps and a geographic location of the UE, the geographic location of the UE being mapped within the set of radio maps associated with the network entity.

17. The method of claim 16, further comprising:

selecting an uplink transmit power for communications with the network entity based at least in part on the channel quality determined using the set of radio maps.

18. The method of claim 17, wherein selecting the uplink transmit power comprises:

determining a predicted pathloss using the set of radio maps, wherein the channel quality is based at least in part on the predicted pathloss.

19. The method of claim 17, wherein selecting the uplink transmit power comprises:

measuring one or more reference signals from the network entity to determine a reference signal power;

determining a filtered reference signal received power (RSRP) using the set of radio maps; and determining a predicted pathloss using the reference signal power and the filtered RSRP, wherein the channel quality is based at least in part on the predicted pathloss.

20. The method of claim 16, further comprising:

receiving a deactivation signal that transitions the UE from the second mode to the first mode, where the UE determines the channel quality by measuring the reference signals from the network entity in response to receiving the deactivation signal.

21. The method of claim 16, further comprising:

receiving, from the network entity, a flag indicating that one or more radio maps in the set of radio maps associated with the network entity has been updated;

obtaining one or more updated radio maps from a radio map server in response to the flag; and transmitting an acknowledgement message to the network entity confirming receipt of the one or more updated radio maps.

22. The method of claim 21, wherein obtaining the one or more updated radio maps comprises:

transmitting a request to the radio map server requesting the one or more updated radio maps, the request comprising an identifier associated with the network entity; and receiving the one or more updated radio maps from the radio map server in response to the request.

23. The method of claim 21, wherein the flag is received in a medium access control-control element (MAC-CE), the MAC-CE comprising an identifier associated with the network entity and the flag.

24. The method of claim 16, wherein the network entity is associated with a plurality of sets of radio maps, each radio map in the plurality of sets of radio maps is associated with an identifier of the network entity and a beam identifier associated with the network entity.

25. The method of claim 16, wherein the activation signal is received in an uplink power control information element (IE) of a radio resource control (RRC) signal and the indication of the set of radio maps is received in a medium access control-control element (MAC-CE).

26. A method for wireless communication at a network entity, comprising:

transmitting, to a user equipment (UE), an activation signal that transitions the UE from a first mode where the UE determines a channel quality using reference signals from the network entity to a second mode where the UE determines the channel quality using radio maps associated with the network entity, each radio map defining information associated with the channel quality for each area within a set of areas corresponding to a coverage area of the network entity;

transmitting a deactivation signal to the UE that transitions the UE from the second mode to the first mode, where the UE determines the channel quality by measuring the reference signals from the network entity in response to receiving the deactivation signal; and transmitting, based at least in part on the activation signal, an indication of a set of radio maps associated with the network entity to the UE, wherein the UE determines the channel quality associated with the network entity using the set of radio maps and a geographic location of the UE, the geographic location of the UE being mapped within the set of radio maps associated with the network entity.

* * * * *